(12) United States Patent
Floyd et al.

(10) Patent No.: US 6,837,698 B2
(45) Date of Patent: Jan. 4, 2005

(54) MULTILAYER COEXTRUSION DIE AND METHOD

(75) Inventors: Robert M. Floyd, Maplewood, MN (US); Douglas A. Devens, Jr., St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 394 days.

(21) Appl. No.: 10/028,052

(22) Filed: Dec. 19, 2001

(65) Prior Publication Data

US 2003/0111762 A1 Jun. 19, 2003

(51) Int. Cl.[7] ............................................. B29C 47/06
(52) U.S. Cl. ............................. 425/131.1; 425/131.5; 425/465; 264/173.12
(58) Field of Search ................ 264/173.12, 177.16; 425/133.5, 131.1, 130, 382.4, 462, 465

(56) References Cited

U.S. PATENT DOCUMENTS

| | | | |
|---|---|---|---|
| 3,485,912 A | | 12/1969 | Schrenk et al. ............. 264/171 |
| 3,487,505 A | * | 1/1970 | Chisholm et al. ......... 425/133.5 |
| 3,565,985 A | * | 2/1971 | Schrenk et al. ......... 264/171.27 |
| 4,152,387 A | | 5/1979 | Cloeren ................. 264/173.13 |
| 4,426,344 A | | 1/1984 | Dinter et al. |
| 4,669,965 A | * | 6/1987 | Murakami ............... 425/133.5 |
| 5,094,788 A | * | 3/1992 | Schrenk et al. ......... 264/173.15 |
| 5,156,857 A | * | 10/1992 | Wang et al. ................ 425/130 |
| 5,236,642 A | * | 8/1993 | Blemberg et al. .......... 264/40.7 |
| 5,269,995 A | | 12/1993 | Ramanathan et al. ....... 264/171 |
| 5,316,703 A | | 5/1994 | Schrenk ..................... 264/1.34 |
| 5,389,324 A | * | 2/1995 | Lewis et al. ............ 264/173.12 |
| 5,780,067 A | * | 7/1998 | Herrington, Jr. .......... 425/131.1 |
| 6,203,742 B1 | | 3/2001 | Kegasawa et al. ..... 264/173.16 |
| 6,221,483 B1 | | 4/2001 | Hilston et al. .............. 428/343 |
| 6,398,535 B1 | * | 6/2002 | Cloeren .................... 425/131.1 |
| 2003/0148095 A1 | * | 8/2003 | Kollaja et al. .............. 428/343 |
| 2003/0201565 A1 | * | 10/2003 | Cloeren ................. 264/173.16 |

FOREIGN PATENT DOCUMENTS

| | | | |
|---|---|---|---|
| DE | 1629349 | 4/1971 | |
| DE | 19806452 A1 | 10/1999 | ........................ 7/1 |
| EP | 0978366 | 2/2000 | |
| JP | 60199627 | 10/1985 | |
| WO | WO 00/06364 | 2/2000 | ..................... 47/14 |
| WO | WO 01/08866 A1 | 2/2001 | ....................... 47/4 |

OTHER PUBLICATIONS

Hens, Jules and VanAbbenyer, Willy "Slide Coating" in: Kistler and Schweizer, *Liquid Film Coating* (London, Chapman & Itall, 1997), pp. 427–462.

Durst, Franz and Wagner, Hans–Günter "Slot Coating" in Kistler and Schweizer, *Liquid Film Coating* (London, Chapman & Itall, 1997), pp. 401–426.

Web page, Rexam Custom Introduces Multilayer Slide Coating Capability.

* cited by examiner

*Primary Examiner*—Mark Eashoo
(74) *Attorney, Agent, or Firm*—Douglas B. Little

(57) ABSTRACT

The invention is an extrusion device comprising an interleaving block portion. The interleaving block portion includes at least two first chambers, each first chamber including a width, a length, a height, and an input aperture. The length dimension of the first chambers are generally parallel. An output aperture is included in each first chamber, the output aperture is wider and shorter in height than the input aperture. A series of first distances are defined between the input aperture to points along the output aperture. A die portion is included in the extrusion device. The die portion has a laminate chamber having a height dimension. The height dimension of the laminate is disposed generally perpendicular to the length dimension of the first chambers. An output is disposed at one end of the height dimension. The laminate chamber is disposed so as to be in communication with the output apertures of the parallel first chambers.

35 Claims, 15 Drawing Sheets

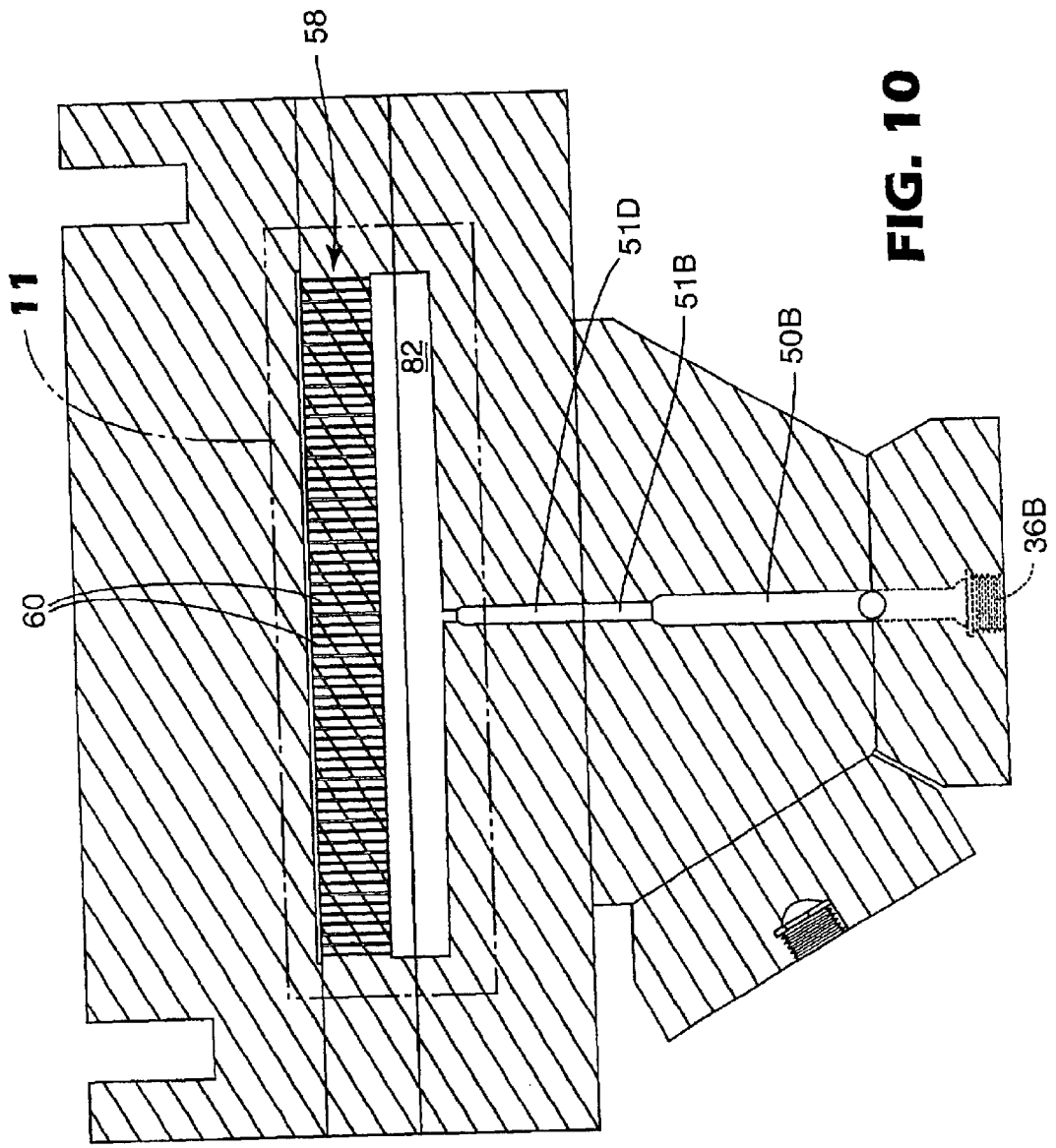

MULTILAYER COEXTRUSION DIE AND METHOD

FIELD OF THE INVENTION

The present invention is directed to an extrusion die. More particularly, the extrusion die is used to produce co-extruded multi-layer polymeric articles.

BACKGROUND OF THE INVENTION

Extrusion dies are used in manufacturing processes to make a variety of goods. Some dies, for example, are used to form thin films, bars or other elongated shapes of plastic material. It is known in the art that many advantages are achieved by the production of multi-layer film constructions of thin films (e.g., using thermoplastics) as this construction enables a combination of properties not available in the unlayered structure. Originally such products were prepared principally by laminating separately formed films or sheets together by adhesives, heat or pressure. Techniques have been developed, however, for melt laminating which involves joining two or more diverse materials (e.g., thermoplastic materials) from separate molten layers under pressure within a die to emerge as a single laminated material. Such processes make use of the laminar flow principle which enables the two or more molten layers under proper operating conditions to join in a common flow channel without intermixing at the contacting interfaces. These multiple layer extrusion systems have come into prominent use as a convenient way to provide for the formation of multiple layers of similar or dissimilar materials.

Various extruded film devices (e.g., dies) have been manufactured to extrude the multiple layer films. One general configuration of device utilized a first die section which combined the various layers of materials. The combined materials were then flattened and extruded through a second die section. An example of this type of device is illustrated by U.S. Pat. No. 5,316,703, incorporated by reference herein in its entirety. This type of device was limited in effectiveness because of thin film manufacturing which requires the multi-layer sheet (or web) to have uniform thickness across the width of the extruded sheet. In particular, if there are great differences in viscosity, temperature, and flow rate, between melted resins which form the resin layers, it can be difficult to obtain multi-layer sheets with the uniform thickness of each layer that is desirable for multi-layer extruded sheets.

Multi-manifold die systems are designed with an individual flow channel/manifold for each layer and normally the layers are brought into contact just before the exit of the die. Because the layers are joined only near the final exit slot, materials with somewhat diverse rheological properties can be processed. The individual layers can be formed at the desired thickness before combining with the remaining layers and adjustments of the flow speed for each individual layer can be effected to maintain uniformity of flow between the various layers. This is necessary, since any tendency towards differences between flow at the junction point between layers can cause non-uniformity in the product.

Additionally, slide coating and slot coating apparatuses have been developed which allows multilayer coating of fluids while they flow down an inclined plane. These types of devices are disclosed in various textbooks, for example, Hens, Jules and VanAbbenyer, Willy "Slide Coating" in: Kistler and Schweizer, Liquid Film Coating (London, Chapman & Itall, 1997), pp. 427–462. Durst, Franz and Wagner, Hans-Gunter "Slot Coating" in: Kistler and Schweizer, Liquid Film Coating (London, Chapman & Itall, 1997), pp. 401–426. The text of these references are incorporated by reference in their entirety herein. These methods of coating require fluids having low viscosity at room temperature which allow the fluids to freely flow. However, these apparatuses do not work for higher viscosity materials, such as thermoplastics, which are fluid only at higher temperatures (e.g., approximately 150° C.). Even at these temperatures, thermoplastics often have high viscosities that would prevent the use of gravity to drive their flow.

Patents which disclose devices for forming multi-layer laminates include U.S. Pat. No. 4,152,387 (Cloeren), U.S. Pat. No. 6,203,742 (Kegasawa et al.) and World Intellectual Property Organization International Publication number WO 01/08866 A1 (Norquist, et al), all of which are incorporated by reference herein.

These devices are limited, however, in the number of layers which can be provided in the extrudate. Attempts to extrude many layers results in dies which are cumbersome and problematic to machine. It is desirable, therefore, to create an extrusion device which allows for a large number of layers to be created in a multi-layer sheet, while simultaneously providing small thickness tolerances for each layer, across the entire width of the sheet.

BRIEF SUMMARY OF THE INVENTION

The invention is an extrusion device comprising an interleaving block portion. The interleaving block portion includes at least two first chambers, each first chamber including a width, a length, a height, and an input aperture. The length dimension of the first chambers are generally parallel. An output aperture is included in each first chamber, the output aperture is wider and shorter in height than the input aperture. A series of first distances are defined between the input aperture to points along the output aperture. A die portion is included in the extrusion device. The die portion has a laminate chamber having a height dimension. The height dimension of the laminate is disposed generally perpendicular to the length dimension of the first chambers. An output is disposed at one end of the height dimension. The laminate chamber is disposed so as to be in communication with the output apertures of the parallel first chambers.

To form a multi-layer extrudate, material is impelled through the plurality of generally parallel first chambers. Each first chamber has a length dimension. The first chambers are generally parallel along the length dimension in an interleaving block. The material is impelled through at least one output into a laminate chamber having a height dimension perpendicular to the length dimension of the first chambers. The material is layered in the laminate chamber. The layered material is extruded from an output disposed at one end of the height dimension of the laminate chamber.

BRIEF DESCRIPTION OF THE DRAWINGS

In this disclosure, multiple extrusion device embodiments are illustrated. Throughout the drawings, like reference numerals are used to indicate common features or components of those devices.

FIG. 10 is a cross-section of one embodiment of the inventive extrusion device as taken along lines 10—10 of FIG. 7.

While the above-identified drawing figures set forth different embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

Figure 1:
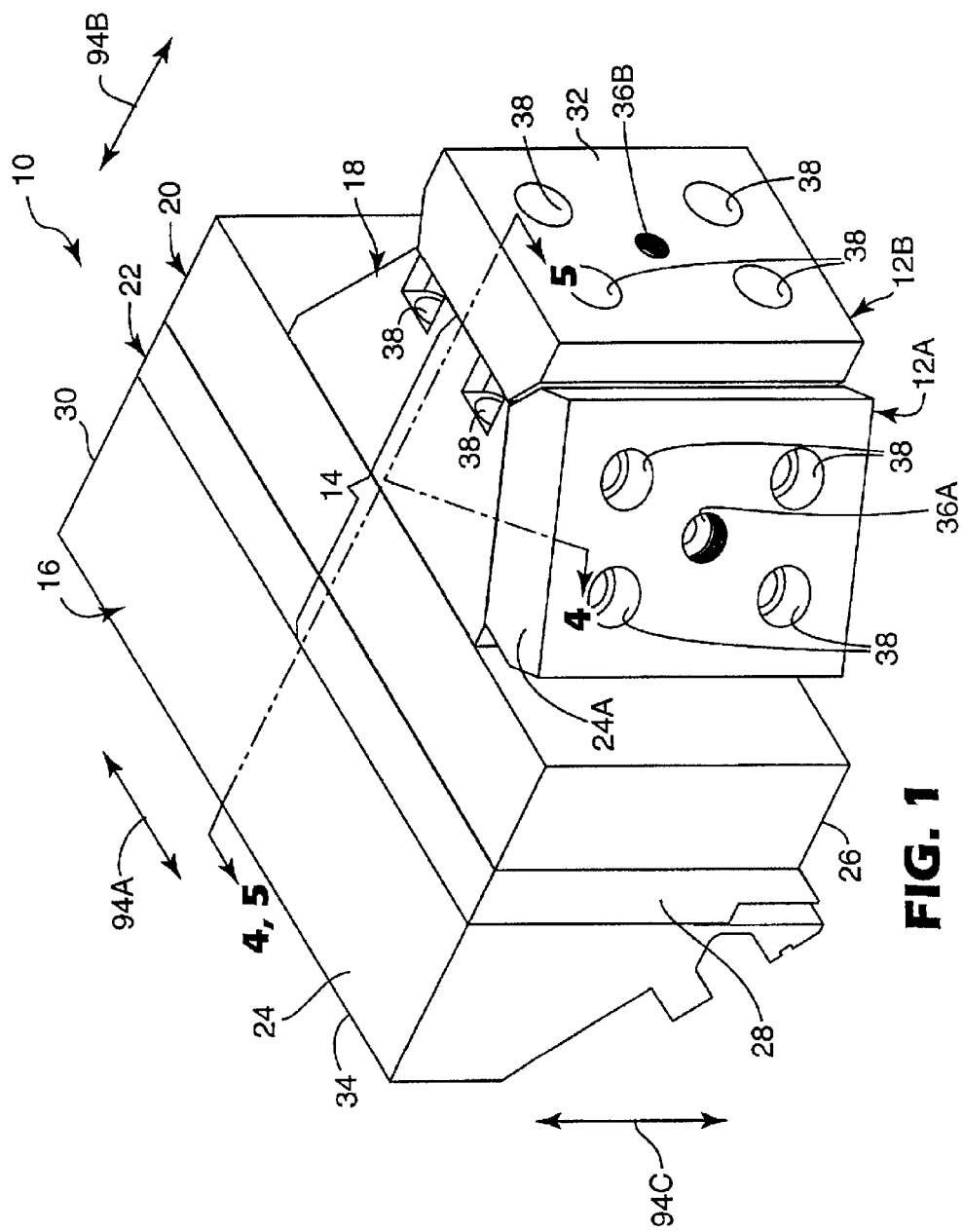
FIG. 1 is a perspective view of one embodiment of an inventive extrusion device.

One embodiment of the inventive extrusion device is shown at 10 in FIG. 1. Extrusion device 10 includes feed blocks 12A and 12B, interleaving block 14 and laminate extrusion block 16. The interleaving block 14 further comprises a passage block 18, a chamber input block 20 and a chamber output block 22. Top, bottom, first, second, front and back sides of the extrusion device are indicated by reference numbers 24, 26, 28, 30, 32, 34, respectively. It should be understood that while descriptive terms such as "top" and "bottom" are used, these terms and others like them are being used for descriptive purposes only and should not be read to imply a specific directional orientation of the device. Additionally, the faces of individual components making up extrusion device 10 will be similarly referenced using numbers 24, 26, 28, 30, 32 and 34 with an appended letter. For example, top side of feed block 12A is referred to utilizing reference number "24A".

Feed apertures 36A and 36B are disposed into feed blocks 12A and 12B, respectively. Bolt holes 38 are illustrated as being disposed through the feed blocks 12A and 12B. Bolt holes 38 are also disposed in passage block 18 and are aligned with bolt holes 38 disposed through feed blocks 12A and 12B. Bolt holes 38 are utilized to clamp the individual blocks (i.e., 12A, 12B, 14, 16, 18, 20 and 22) together, forming the overall extrusion device 10. This technique is known to those skilled in the art and is accomplished by extending bolts (not shown) through the bolt holes 38 and securing and providing a clamping force (e.g., using nuts or internal threads (not shown)). Additional bolts and bolt holes (not shown) can be used throughout the device to securely clamp the device 10 together. Additionally, other connecting and securing techniques such as utilizing dowel pins (not shown) along with other techniques known in the art may be utilized in the extrusion device 10.

Figure 2:
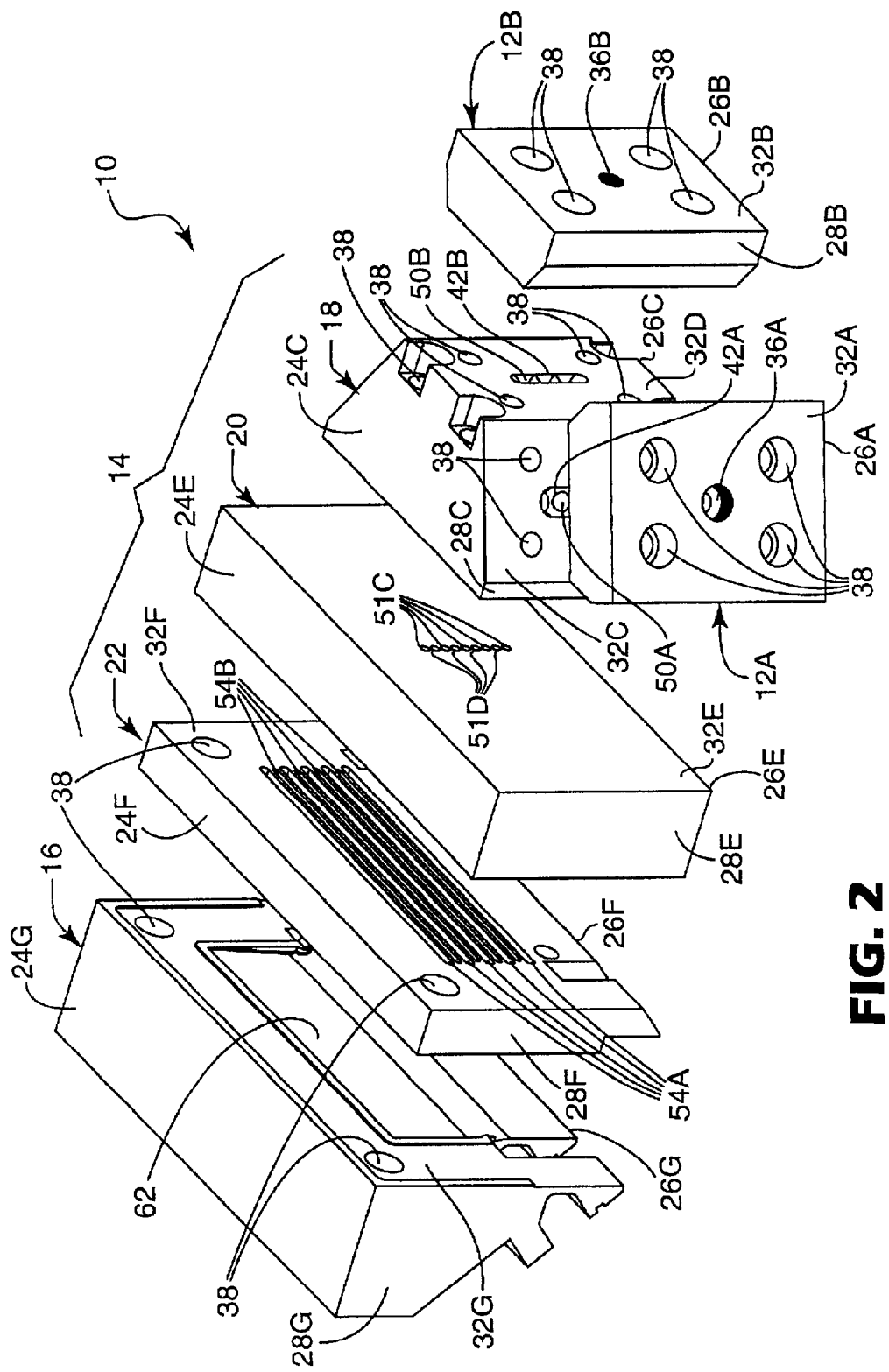
FIG. 2 is an exploded perspective view of one embodiment of the inventive extrusion device.
Figure 3:
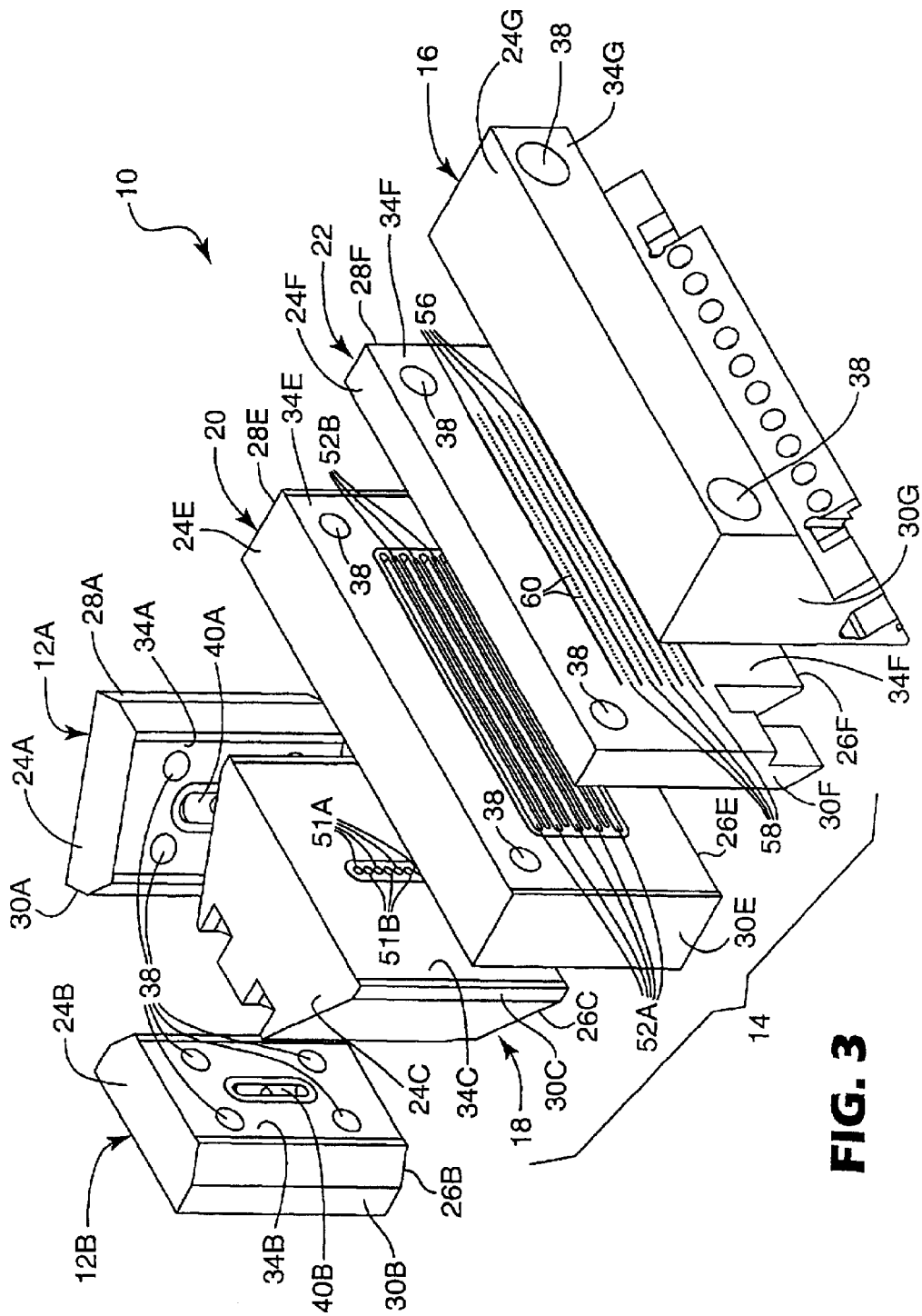
FIG. 3 is an exploded perspective view of one embodiment of the inventive extrusion device.

An exploded perspective view of inventive extrusion device 10 is illustrated in FIGS. 2 and 3. Feed apertures 36A and 36B extend through feed blocks 12A and 12B, and are in communication with manifold indentations 40A and 40B, respectively, is located on back sides 34A and 34B of feed blocks 12A and 12B. Substantially similarly shaped manifold indentations 42A and 42B are located on front sides 32C and 32D of passage block 18. Securing each feed block 12A and 12B onto front sides 32C and 32D of passage block 18 (e.g., by bolting the blocks together) and aligning indentations 40A and 40B on the feed blocks 12A and 12B with indentations 42A and 42B (having substantially similar shape as indentations 40A and 40B) on passage block 18 forms distribution manifolds (described further with respect to FIGS. 4 and 5). A series of first plenums 50A extend into passage block 18 from indentation 42A. A series of second plenums 50B extend into passage block 18 from indentation 42B. First plenums 50A interleave with second plenums 50B, similar to the intersection of the teeth of two combs. This "interleaving" of the plenums is further discussed and illustrated with respect to FIG. 6, below. While in one embodiment five first plenums 50A and four second plenums 50B extend into passage block, any number of first and second plenums 50A and 50B are contemplated by the invention.

Internally to passage block 18, first and second plenums 50A and 50B are "necked down", or in other words, transitioned into smaller first and second tube passages 51A and 51B. First and second tube passages 51A and 51B emerge from back side 34C of passage block 18. In the illustrated embodiment, the first and second tube passages 51B are alternated (or "interleaved") and aligned so as to be substantially parallel along a height dimension (i.e., from the top side 24C to the bottom side 26C) of passage block 18. Alternate embodiments of the current invention would interleave and align first and second tube passages 51A and 51B along a width dimension of passage block 18 (i.e., from first side 28C to second side 30C of passage block 18), or alternatively in any other dimension through interleaving block 18. Third and fourth tube passages 51C and 51D extend into front side 32E of chamber input block 20. The third and fourth tube passages 51C and 51D are disposed along a height dimension (i.e., from top side 24E to bottom side 26E) of the chamber input block 20, so that third passages 51C are aligned with first tube passages 51A of passage block 18 and fourth tube passages 51D are aligned with the second tube passages 51B of passage block 18.

A series of first and second grooves 52A and 52B extend into back side 34E of chamber input block 20. The series of first and second grooves 52A and 52B are generally parallel and perpendicular to the height dimension of chamber block 20. Thus, each groove includes a height dimension. The first grooves 52A are parallel to each other and have widths extending from first side 28E to second side 30E of the chamber input block 20. First grooves 52A are aligned so that each first groove 52A is in communication with one of the third tubes 51C. Similarly, second grooves 52B are parallel and aligned vertically so that each second groove 52B is in communication with one of fourth tube 51D.

Third and fourth grooves 54A and 54B extend into front side 32F of chamber output block 22 and have widths extending from first side 28F to second side 30F of chamber output block 22. The series of third grooves 54A are parallel to each other and extend perpendicular to a height dimension (i.e., from the top 24F to the bottom side 26F) of chamber output block 22 such that when chamber input block 20 and chamber output block 22 are mated, third grooves 54A are substantially aligned and in communication with first grooves 52A. Similarly, the series of fourth grooves 54B are parallel and extend perpendicular to the height dimension of chamber output block 22 such that when chamber input block 20 and chamber output block 22 are mated, fourth grooves 54B are substantially aligned and are in communication with second grooves 52B. Bolts (not shown) may be inserted through the metal between first and second grooves 52A and 52B as well as between third and fourth grooves 54A and 54B further securing chamber input block 20 to chamber output block 22. This can be done to prevent "clamshelling" or bowing of the metal between the grooves when material is passed through extrusion device 10.

A series of gap output apertures 56 extend into back side 34F of chamber output block 22. The series of gap output apertures are substantially parallel and extend perpendicular to the height dimension of output block 22 such that each gap output aperture 56 is in communication with one of the third grooves 54A. A series of aperture arrays 58 (or chamber openings) extend into back side 34F of chamber output block 22. Each aperture array 58 includes multiple holes 60 aligned along a width dimension (i.e., from first side 28F to second side 30F of chamber output block 22). Each of aperture array 58 is aligned vertically such that holes 60 of each array 58 are in communication with one of the fourth grooves 54B. In one embodiment, each aperture array 58 is offset from the next such that holes 60 are staggered along the height dimension of the extrusion device 10. This allows device 10 to extrude a final extrudate material having offset fibers, which can be desirable in certain applications. Laminate chamber 62 extends into front 32G of laminate extrusion block 16. Though the number of holes can vary, in one embodiment, 66 or 67 holes are included in each aperture array 58 depending upon the stagger of holes 60. Holes 60 can be spaced approximately 0.15 inches (3.81 mm) apart, resulting in a slight variation in the width of each fourth groove 54B, depending upon the number of holes 60. In one embodiment, the width of the chamber array is 9.9 inches (251.5 mm) for 67 holes and 9.8 inches (248.9 mm) for 66 holes.

A width dimension of laminate chamber 62 is preferably substantially the same as the greatest width dimension of gap output apertures 56. Additionally, the height (or vertical) dimension of laminate chamber 62 is configured such that when laminate extrusion block 16 is mated to chamber output block 22, all of the gap output apertures 56 and aperture arrays 58 are encompassed by laminate chamber 62. The height dimension of the laminate chamber is disposed substantially perpendicular to the length of the first and second chambers 72 and 82. This provides an efficient way to collect all the materials extruded from gap output aperture 56 and aperture arrays 58 allowing the materials to be maintained at high extrusion pressures (e.g., typical for thermoplastic material extrusion) and temperatures (again, typical for thermoplastic material extrusion). As an example, pressures into extrusion device can be 500 psi (3.44 MPa) or more.

Extrusion block 16 is secured to chamber output block 22 using bolts so as to withstand the pressures of materials forced through the extrusion device 10. Additionally, heating elements (not shown) can be placed throughout the metal forming extrusion device 10 in order to maintain the materials forced through extrusion device 10 at temperatures which facilitate flow (e.g., approximately 200° C.). Thermocouples (not shown) may be placed throughout the device to provide feedback as to the temperature of the materials and extrusion device 10.

Figure 4:
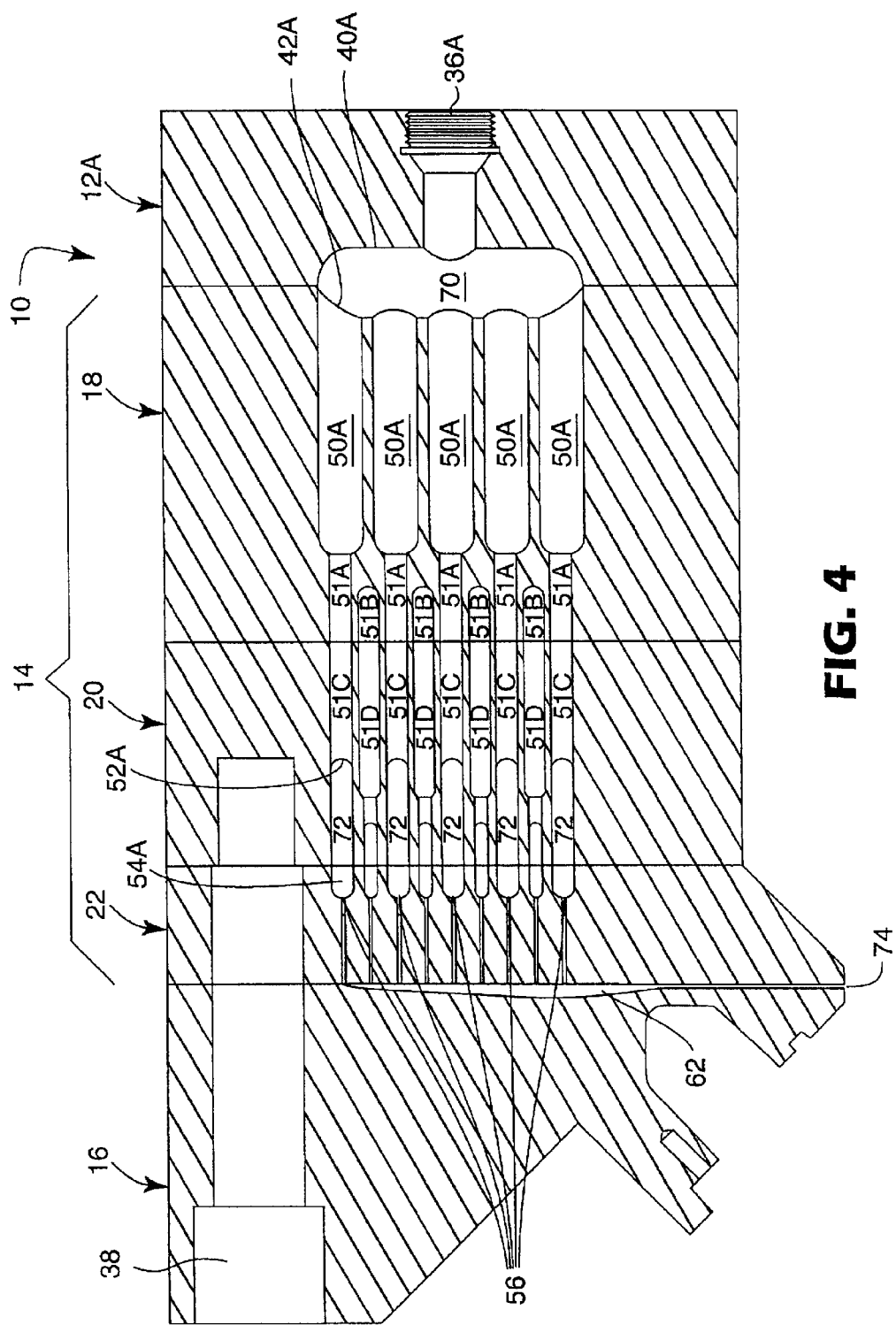
FIG. 4 is a cross-section of one embodiment of the inventive extrusion device as taken along line 4—4 of FIG. 1.
Figure 5:
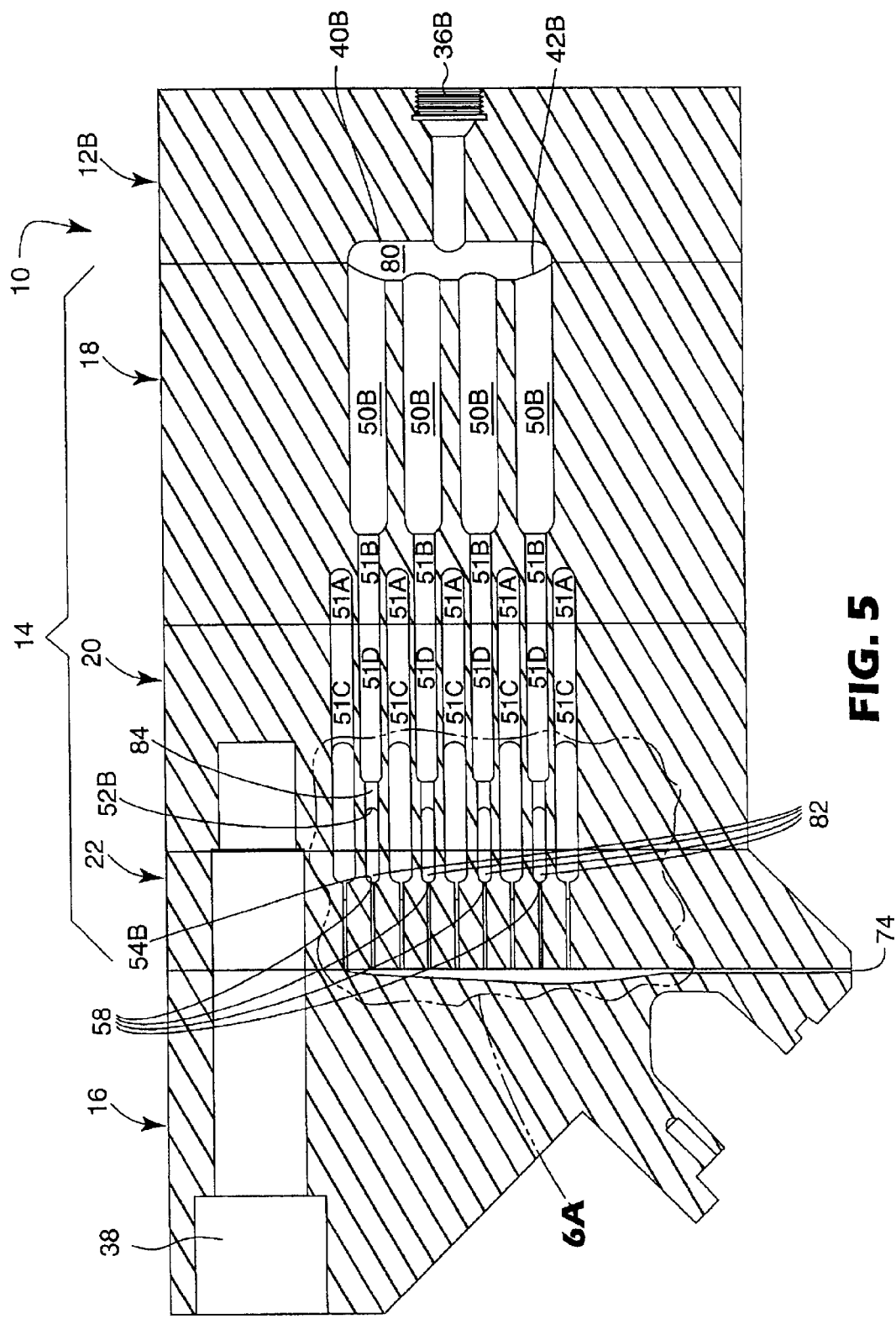
FIG. 5 is a cross-section of one embodiment of the inventive extrusion device as taken along a plane indicated by line 5—5 of FIG. 1.

FIGS. 4 and 5 illustrate the interconnected voids throughout the inventive extrusion device which form flow paths for the materials making up a final extrudate. FIG. 4 illustrates a cross-section of the inventive extrusion device 10 as taken along lines 4—4 of FIG. 1. This cross-section illustrates the path through the first feed block 12A where it enters the passage block 18 portion of the interleaving block 14. The material passes through the chamber input block 20 and chamber output block 22 until it reaches the laminate extrusion block 16. As illustrated, feed aperture 36A is in communication with indentation 40A in the feed block 12A. Indentation 40A is mated to indentation 42A on the passage block 18 forming first manifold 70. Typically, an extruder (not shown) of a type commonly known in the art such as a single screw extruder, is used to force a first material such as for example, polyester, polypropylene or polyethylene (among others) into feed aperture 36A. The first material travels into first manifold 70 which, in one embodiment has a vertical dimension of approximately 3.2 inches (81.3 mm) and a diameter of approximately 0.8 inches (20.3 mm). After product enters first manifold 70, it fills the void provided by first manifold 70 and the pressure of the first material equalizes across all first plenums 50A. Although the embodiment illustrated utilizes one common input source for all of first plenums 50A, an alternate embodiment would provide a different source for any or all of first plenums 50A (e.g., utilizing a differing feed aperture for each first plenum 50A).

While five first plenums 50A are illustrated in FIG. 4, any number of first plenums 50A can be included in extrusion device 10 by increasing the height dimension of the components forming extrusion device 10 (i.e., feed blocks 12A and 12B, interleaving block 14 and laminate extrusion block 16). Additionally, the height dimension of first manifold 70, the size of feed aperture 36A, and/or the number of feed apertures directed into manifold 70, can be varied according to the number of layers or number of different materials desired in the extruded laminate material. First plenums 50A are disposed generally parallel to each other, creating the ability to increase the number of plenums without causing them to interfere with one another. First plenums 50A are "necked down" into first tubes 51A so that they may be interleaved with second tube passages 51B in passage block 18. By forming the first plenums 50A at a larger volume than first tube passages 51A, pressure drops through the first plenums 50A are minimized. As would be understood by a person skilled in the art, minimizing the pressure drop throughout the device allows for smaller pressure to be generated by the extruder, as well as less strain on the material forming the extrusion device 10. Additionally, this configuration minimizes the height of interleaving block 14 which is necessary to interleave first tube passages 51A and second tube passages 51B.

The first tube passages 51A are aligned with third tube passages 51C in chamber input block 20. While passage block 18 and chamber input block 20 could feasibly be constructed of one piece of solid metal, splitting passage block 18 and chamber input block 20 into two pieces allows easier machining of extrusion device 10. Third tube passages 51C enter into a series of first chambers 72 formed by first and third grooves 52A and 54A. In an alternate embodiment, the plenum/tube size could be constant throughout the block which would require higher pressures throughout the apparatus. Gap output apertures 56 provides an exit for material in each first chamber 72. Material exiting each first chamber 72 enters laminate chamber 62 and heads downward. As each layer of material enters the laminate chamber 62 it impinges on the material being emitted from the aperture immediately above it. Thus, laminate chamber 62 in laminate extrusion block 16 acts to "pile" each of the "streams" of material emitted from gap output apertures 56 onto each other forming a laminate which is then extruded out of laminate chamber 62 through lip opening 74. Laminate extrusion block 16 acts to cap the streams and withstand the pressures required to extrude higher viscosity materials such as thermoplastics.

FIG. 5 illustrates a cross-section of the inventive extrusion device as taken along lines 5—5 of FIG. 1. The cross-section illustrates the path of material introduced through second feed block 12B where it enters passage block 18 portion of interleaving block 14. The material passes through chamber input block 20 and chamber output block 22 until it reaches laminate extrusion block 16. As illustrated, feed aperture 36B is in communication with indentation 40B in feed block 12B. Indentation 40B is mated to indentation 42B on passage block 18, forming second manifold 80. As discussed previously, an extruder is typically used to force a second material (different from that introduced into first manifold 70) into feed aperture 36B. Typically, materials are used which have similar melt viscosities at similar processing temperatures. These materials can be as diverse as pressure sensitive adhesives and thermoplastic polymers. The second material travels into second manifold 80 which, in one embodiment, has a height dimension of approximately 2.4 inches (61.0 mm) in a diameter of approximately 0.4 inches (10.2 mm).

After product enters second manifold 80, it fills the space provided by second manifold 80 and the pressure of the material is equalized across all second plenums 50B. While four second plenums 50B are illustrated in FIG. 5, any number of second plenums 50B can be included in extrusion device 10 by increasing the vertical dimension of the extrusion device components (as was previously discussed with respect to first plenums 50A). Additionally, the vertical dimension of second manifold 80 and the size of feed aperture 36B can be varied according to the number of layers desired in the extruded laminate material (depending upon the application). Second plenums 50B (similar to first plenums 50A) are disposed generally parallel to each other, creating the ability to increase the number of second plenums 50B without causing them to interfere with one another. Second plenums 50B are "necked down" into second tube passages 51B so that they may be interleaved with first tube passages 51A in passage block 18. This change in diameter allows constant pressure to be provided to the material entering each of second tube passages 51B from second plenums 50B. Second tube passages 51B are aligned with fourth tube passages 51D in chamber input block 20 (again passage block 18 and chamber input block 20 are separated for ease of machining). Fourth tube passages 51D enter into a series of second chambers 82 formed by second and fourth grooves 52B and 54B. As illustrated, the transition between fourth tube passages 51D and second chambers 82 can include an additional "necking down" through transitional tubes 84. Again, keeping the fourth tube passages 51D as large as possible before entering transitional tubes 84 acts to minimize pressure drop (and consequently keep a constant flow) of material into second manifolds 80 while simultaneously allowing the first chambers 72 and second chambers 82 to be minimized in height such that they can be closely interleaved. Second material exits each second chamber 82 at chamber opening 58.

In one embodiment, second chambers 82 are shorter than first chambers 72, reducing the total height of the interleaved chambers 72 and 82, allowing the total height of extrusion device 10 to be reduced in size. Second chambers 82 can typically be reduced in height when a matrix material is introduced in first chambers 72 and a fiber material is introduced in second chambers 82. When a fiber material flows through second chambers 82, the flow rate required of the material is typically less than that of the matrix material, lessening the pressure drop of the fiber material as it flows through extrusion device 10 (compared to that of the matrix material), allowing the height of second chambers 82 to be less than first chambers 72.

It should be noted that in one embodiment of the invention, the length of the first and second chambers 72 and 82 (i.e., in the direction from front side 32 to block side 24 of extrusion device) is long enough that each chamber can be disposed further forward or backward in extrusion device 10 (as discussed further with respect to FIG. 6A) while still allowing chamber input block 20 and chamber output block 22 to separate through first and second chambers 72 and 82 regardless of their position in extrusion device 10. Configuring the device 10 in this manner allows for convenient machining of chambers 72 and 82.

Figure 5A:
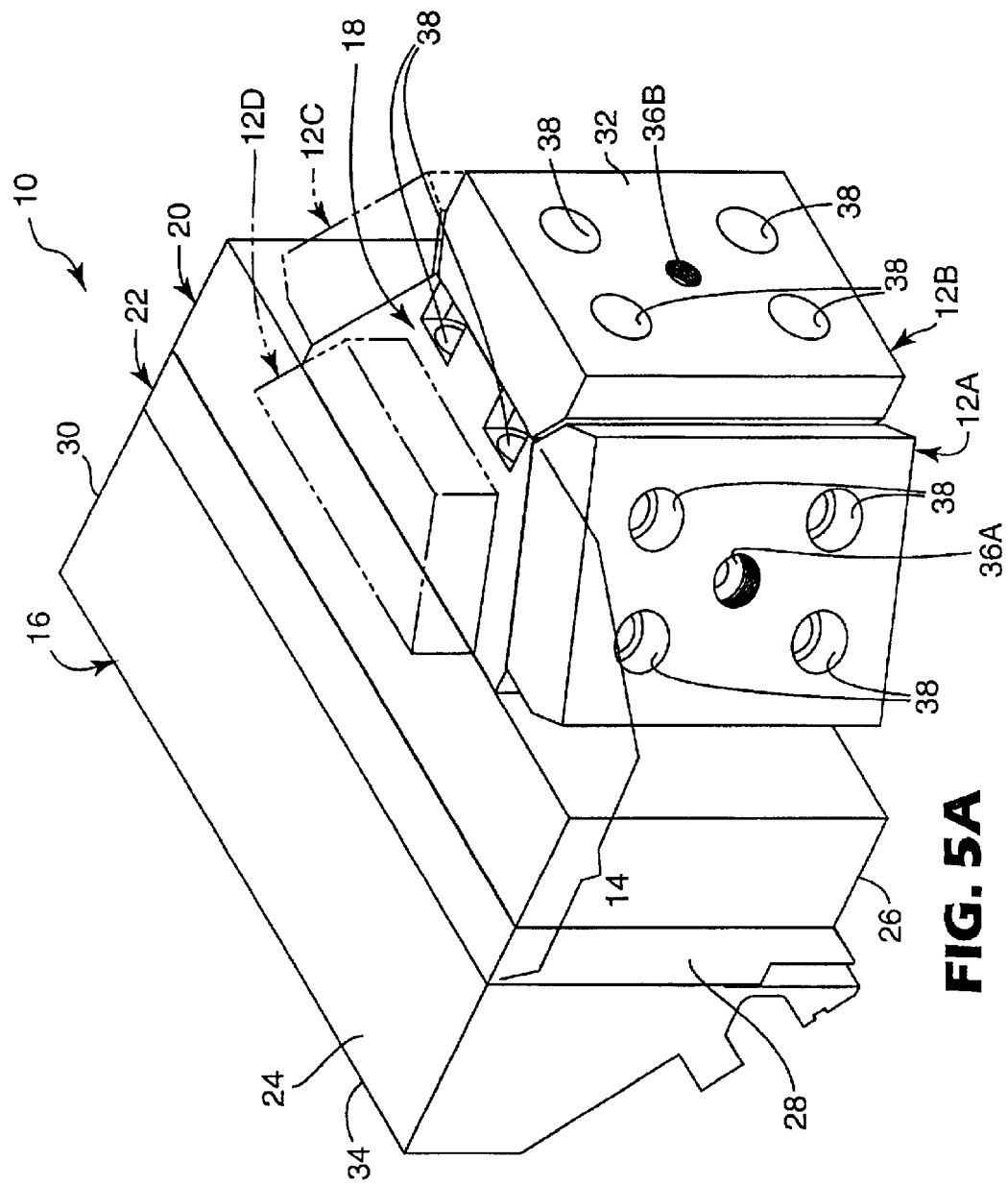
FIG. 5A is a perspective view of an alternate embodiment of the inventive extrusion device.

The second material enters laminate chamber 62 and is directed downward. As each layer enters the laminate chamber 62 it impinges on the material being emitted from gap output aperture 56 (i.e., from first chamber 72) immediately above it. Thus, laminate chamber 62 acts to layer each of the streams in an alternating fashion (i.e., first material and second material) onto each other forming a laminate. The laminate is then extruded out of laminate chamber 62 between lip opening 74. The inventive extrusion apparatus 10 can form extrudate having additional layers beyond the illustrated embodiment by stacking more first chambers 72 and second chambers 82 on top of each other. Additional chambers can be accommodated by extending the height of the extrusion apparatus 10. Not only does the inventive extrusion apparatus 10 allow for a large number of layers to be formed into an extrudate, it also can allow for a variety of materials to be utilized to create the layers by connecting multiple extruders to different input plenums. For example, an alternate embodiment of the extrusion apparatus could incorporate additional feed blocks 12C and 12D, shown in dotted lines in FIG. 5A, to provide additional extruder connections. Additionally, the shape of passage block 18 can be altered to accommodate additional feedblocks, such as by shaping the horizontal cross-section of passage block 18 to be in the shape of one half of a decagon.

Figure 6:
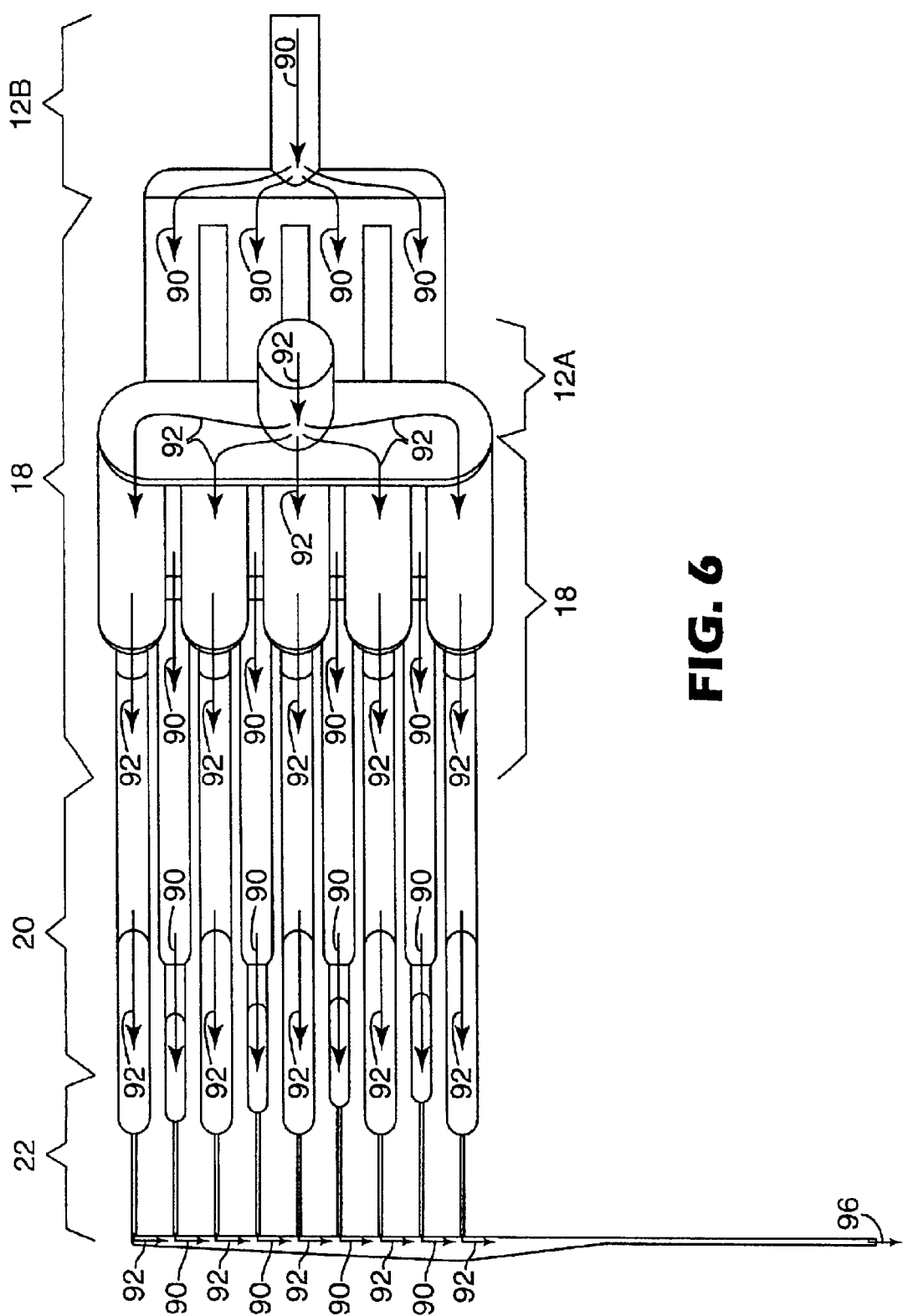
FIG. 6 is a schematic showing one embodiment of material flow path through one embodiment of the inventive extrusion device.

FIG. 6 is a schematic view of the chambers, plenums and manifolds which form the flow path for the first and second materials of the present invention. The first material is indicated by arrows 92 and the second material is indicated by arrows 90. Brackets are used to indicate where each portion of interleaving block 14 (e.g., passage block 18, chamber input block 20 and chamber output block 22) as well as feed blocks 12A and 12B would be positioned. As is illustrated, the first material 92 flows along alternating (or interleaved) paths with respect to the second material 90. All the paths are layered onto each other at the laminate extrusion block 16 resulting in a multiple layer laminate extrudate 96.

Figure 6A:
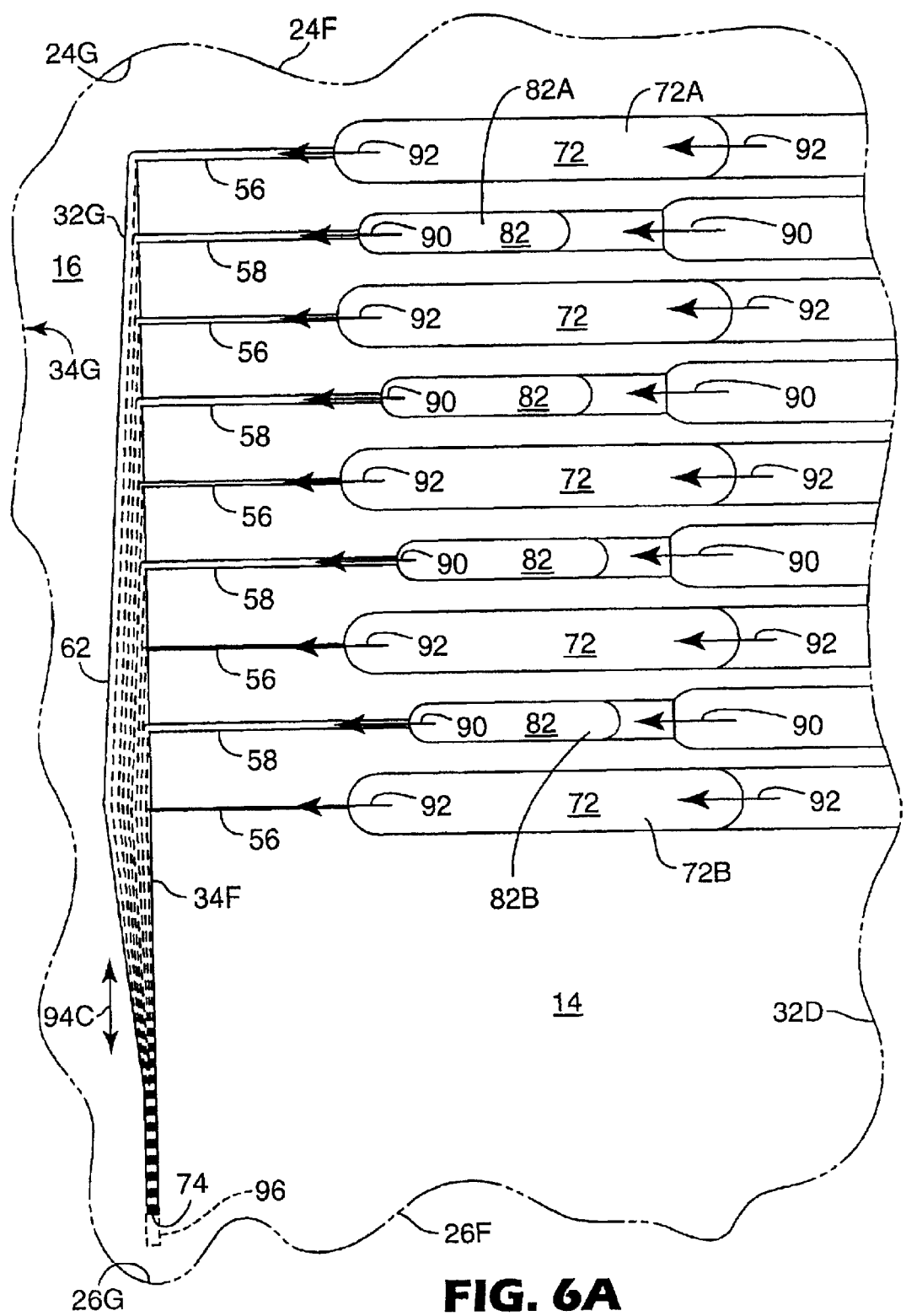
FIG. 6A is a close up sectional view of the area indicated by number 6A in FIG. 5.

FIG. 6A is an enlarged sectional view of the area of FIG. 5 indicated by reference number 6A. First material 92 flows through each of first chambers 72. In one embodiment, each first chamber 72 has a length dimension (i.e., in the direction from front 32 side to back side 34 of extrusion device 10) of approximately 1.6 inches (40.6 mm) and a height dimension of approximately 0.3 (7.6 mm). It should be noted that this height dimension is substantially constant along the length and width of the first chambers, again providing ease of machining when forming the device 10. The width dimension of each first chamber 72 (i.e., direction from first side 28 to second side 30 of the extrusion device 10) is approximately 10.3 inches (261.6 mm).

Second material 90 flows through each of second chambers 82. In one embodiment each of second chambers 82 has a length dimension of approximately 0.87 inches (22.1 mm), a height dimension of approximately 0.16 inches (4.06 mm) and a width dimension of approximately 9.9 inches (251.5 mm) or 10.0 inches (254.0 mm) depending upon the number holes 60 in chamber opening 58. Again, the height dimension of the second chambers 82 is substantially constant along the length and width of the second chambers 82, simplifying machining requirements of extrusion device 10.

First material 92 flows through gap output aperture 56 from each of first chamber 72, and is directed to laminate chamber 62. Similarly, second material 90 flows through chamber openings 58 extending from each second chamber 82 to laminate chamber 62. Laminate chamber 62 is disposed substantially perpendicular to first chambers 72 and second chambers 82 as well as to gap output apertures 56 and chamber openings 58. Disposing laminate output chamber 62 in such a manner allows the multiple layers formed by first material 92 flowing through first chambers 72 second material 90 flowing through second chambers 82 to be combined such that weld lines are minimized. For example, in the embodiment of the invention illustrated, weld lines (i.e., the interface at which point two or more material layers are joined) occur in extrudate 96 (indicated by dotted lines in FIG. 6A) exiting lip opening 74. These weld lines occur along a plane defined by an x-axis (i.e., illustrated by arrow 94A shown in FIG. 1) and a y-axis (i.e., illustrated by arrow 94C) (so there are weld lines in the x-y plane). By disposing laminate chamber 62 perpendicular with respect to gap output apertures 56 (as in FIG. 6A) chamber openings 58 first chambers 72 and second chambers 82, can have widths that are substantially the same as laminate chamber 62, allowing the materials forming extrudate 96 to be spread before they are combined in laminate chamber 62, while maintaining the compactness of the extrusion device 10. The ability to spread the materials before combining them allows continuous layers of material in the width direction, eliminating weld lines in the y-z plane (of the extrudate 96). In particular, the inventive extrusion device allows a larger number of matrix material (continuous) layers to be extruded with fiber (discontinuous layers) materials without the need to divide the matrix (continuous) layers along the y-z plane (of extrudate 96). Weld lines (such as those in the y-z plane of the extrudate 96) weaken the rest of the polymer body because the large molecular weight of the polymers slows interdiffusion of the polymer with itself. Eliminating these weld lines strengthens the layers (and thus the end product), since these lines of weakness are eliminated.

Additionally, disposing laminate chamber 62 perpendicularly limits the amount of machining required to create extrusion device 10. The complexity of the machining is also limited, allowing more precision tolerances to be obtained in the extrusion device 10. This minimizing of the complexity of the machining is due to the ability of the extrusion device 10 to be divided into sections along a height dimension (e.g., between interleaving block portion 14 and laminate extrusion block 6).

The precisely machined extrusion device 10 allows the creation of high precision openings which are needed to exactly control the flow of each material layer as it enters into and proceeds through laminate chamber 62. As discussed previously, it is desirable for the flow rate of each material layer to match the layer to which it is being joined in order to minimize non-uniformity of extrudate 96. To provide a matching flow of each of the various layers as they enter and proceed through laminate chamber 62, various construction methods are utilized. For example, as illustrated by gap output apertures 56, the height of each output aperture 56 can be varied to create greater or lesser resistance to the flowing material. In the embodiment illustrated, the thickness of the gap output apertures 56 is increased along the height dimension of the interleaving block such that a top first chamber 72A feeds through the largest gap output aperture 56 (i.e., the tallest output aperture) and a bottom first chamber 72B feeds through the smallest gap output aperture 56 (i.e., the shortest output aperture). Thus, first material 92 encounters less resistance as it flows through top first chamber 72A and this resistance is incrementally increased through each subsequent first chamber 72 until the bottom first chamber 72B experiences the highest resistance to flow. This is required, since top first chamber 72A is farther away from lip opening 74 of laminate chamber 62 than bottom first chamber 72B. As the distance from the output of the laminate chamber 62 is increased, the pressure drop required to force material through the extrusion device 10 is increased proportionately. Increasing the resistance of shorter material flow paths balances the higher pressure drop of the longer flow paths.

The shape of laminate 62 deepens as it extends from top side 24G to bottom side 26G of laminate extrusion block 16. Laminate chamber 62 increases in depth in order to accommodate the increasing number of material layers which are being introduced by gap output apertures 56 and chamber openings 58. In one embodiment, at the point where top first chamber 72A communicates with laminate chamber 62, laminate chamber 62 is approximately 0.03 inches (0.76 mm) deep (i.e., from front side 32G to back side 34G of laminate extrusion block 16). Laminate chamber 62 deepens to approximately 0.19 inches (4.83 mm) at the point where bottom first chamber 72B communicates with laminate chamber 62 approximately 2.6 inches (66.0 mm) from top first chamber 72A. Laminate chamber 62 then narrows to approximately 0.05 inches (1.27 mm) at lip opening 74. Lip opening 74 can be adjusted in depth to vary the thickness of extrudate 96.

In one embodiment, the height of gap output aperture 56 for top first chamber 72A is approximately 0.035 inches (0.889 mm). The height of gap output aperture 56 for bottom first chamber 72B is approximately 0.025 inches (0.635 mm). The intervening first chambers 72 have gap output aperture heights of 0.029 inches (0.737 mm), 0.027 inches (0.686 mm) and 0.026 inches (0.660 mm), proceeding from top side 24F to bottom side 26F of interleaving block 14.

In one embodiment, chamber output openings 58 can utilize this same technique. As discussed, chamber openings 58 can be holes 60 as discussed previously which utilize varying diameter sizes to increase or decrease resistance.

While round holes 60 are illustrated, it should be understood that output openings can also be slots, squares, elipses or any number of other shaped openings. Additionally, the shape of holes 60 can vary in each array or from one array to the next.

While changing the height or diameter of the opening into the laminate chamber may be utilized to change the resistance to flow of the material, the holes 60 in one preferred embodiment have a diameter approximately 0.03 inches (0.76 mm) and our alternate method for varying resistance is used. This alternate method for providing varied resistance to material flow is illustrated in FIG. 6A by chamber output openings 58 which extend from second chambers 82 to laminate chamber 62. The length of each second chamber opening 58 increases (i.e., in the direction from front side 32D to back side 34F of interleaving block 14) from each second chamber 82 to the adjacent second chamber 82 immediately below; along the height dimension of the interleaving block 14. In other words, top second chamber 82A feeds through chamber opening 58 having the shortest length, while bottom second chamber 82B feeds through chamber opening 58 having the longest length and the chambers in between the top second chamber 82A and bottom second chamber 82B feed through chamber openings 58 incrementally increasing in length. This increase in length accomplishes the same goal discussed previously of increasing resistance for the chambers feeding the bottom of the laminate chamber 62 (near lip opening 74) versus those feeding the top of the laminate chamber 62 (farther from lip opening 74).

In one embodiment, the length of chamber opening 58 for top second chamber 82A is approximately 1.00 inches (25.40 mm) at the middle (width) of top second chamber 82A and approximately 0.92 inches (23.37 mm) at the ends (width) of top second chamber 82A. The length of chamber opening 58 for bottom second chamber 82B is approximately 1.18 inches (29.97 mm) at the middle (width) of bottom second chamber 82B and approximately 1.10 inches (27.94 mm) at the ends (width) of bottom second chamber 82B. The intervening second chambers 82 have chamber opening 58 lengths of approximately 1.10 inches (27.94 mm) at the center, approximately 1.02 inches (25.91 mm) at the ends, and approximately 1.13 inches (28.70 mm) at the center, approximately 1.05 inches (26.67 mm) at the ends, proceeding from top side 24F to bottom side 26F of interleaving block 14.

The two methods described above are used to provide a balancing effect for the flow rate of material entering the laminate chamber 62. Please note that either of these methods can be used with first chambers 72 or second chambers 82 and the illustrated embodiment is meant to be exemplary and not limiting.

Figure 6B:
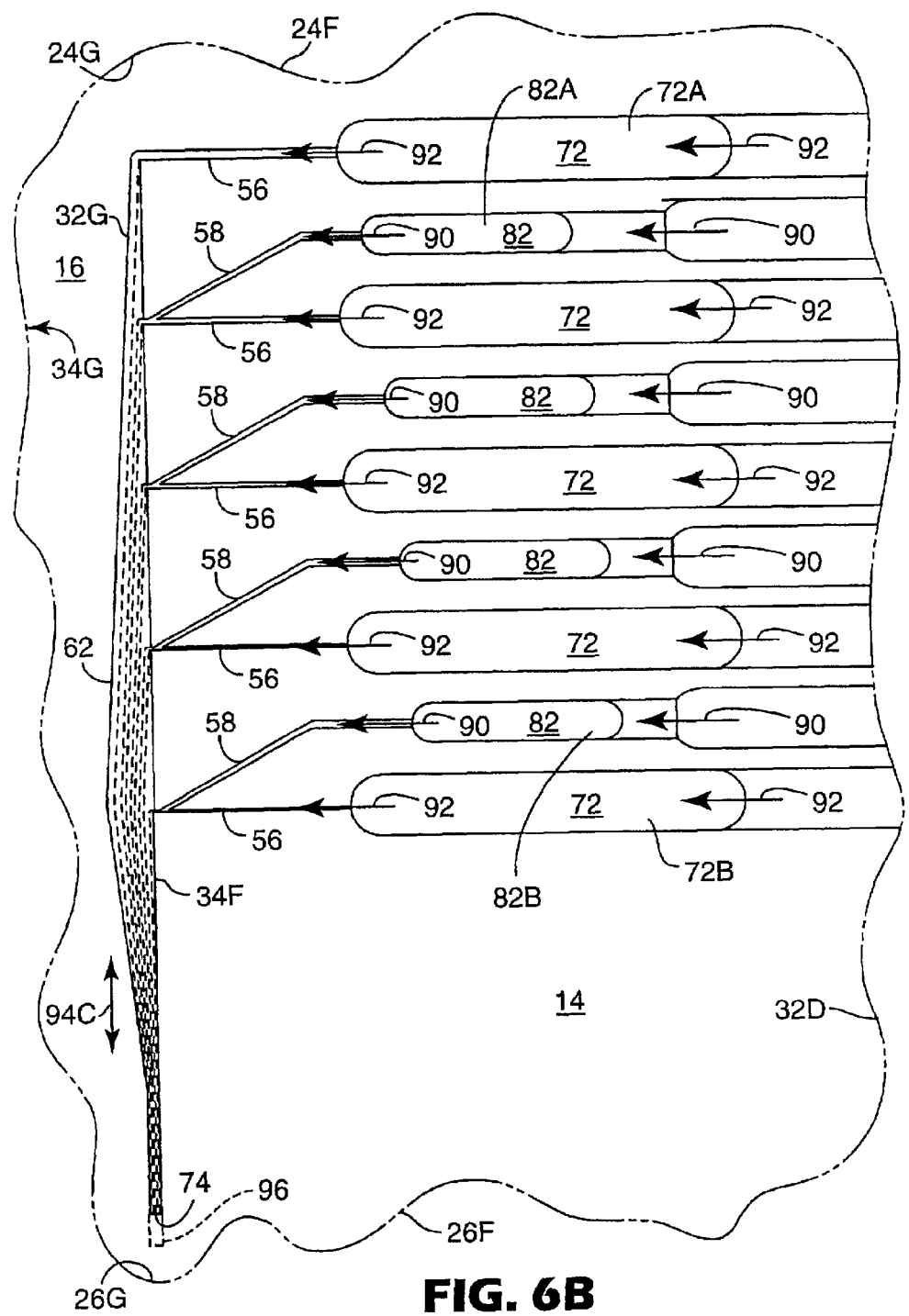
FIG. 6B is an alternate embodiment of close up sectional view of the area indicated by number 6A in FIG. 5.

An alternate embodiment of the inventive extrusion device is illustrated in FIG. 6B. In this embodiment, chamber openings 58 are directed into gap output apertures 56 which are in communication with laminate aperture 62. Thus, second material 90 is layered into first material 92 in gap output apertures 56. These "prelaminates" are then layered in laminate chamber 62. The illustrated embodiment allows velocities to be finely matched between second material 90 as it is introduced into first material 92, and flow rates can be fine tuned. Joining can occur nearer or further from laminate chamber 62 depending on process requirements.

Figure 7:
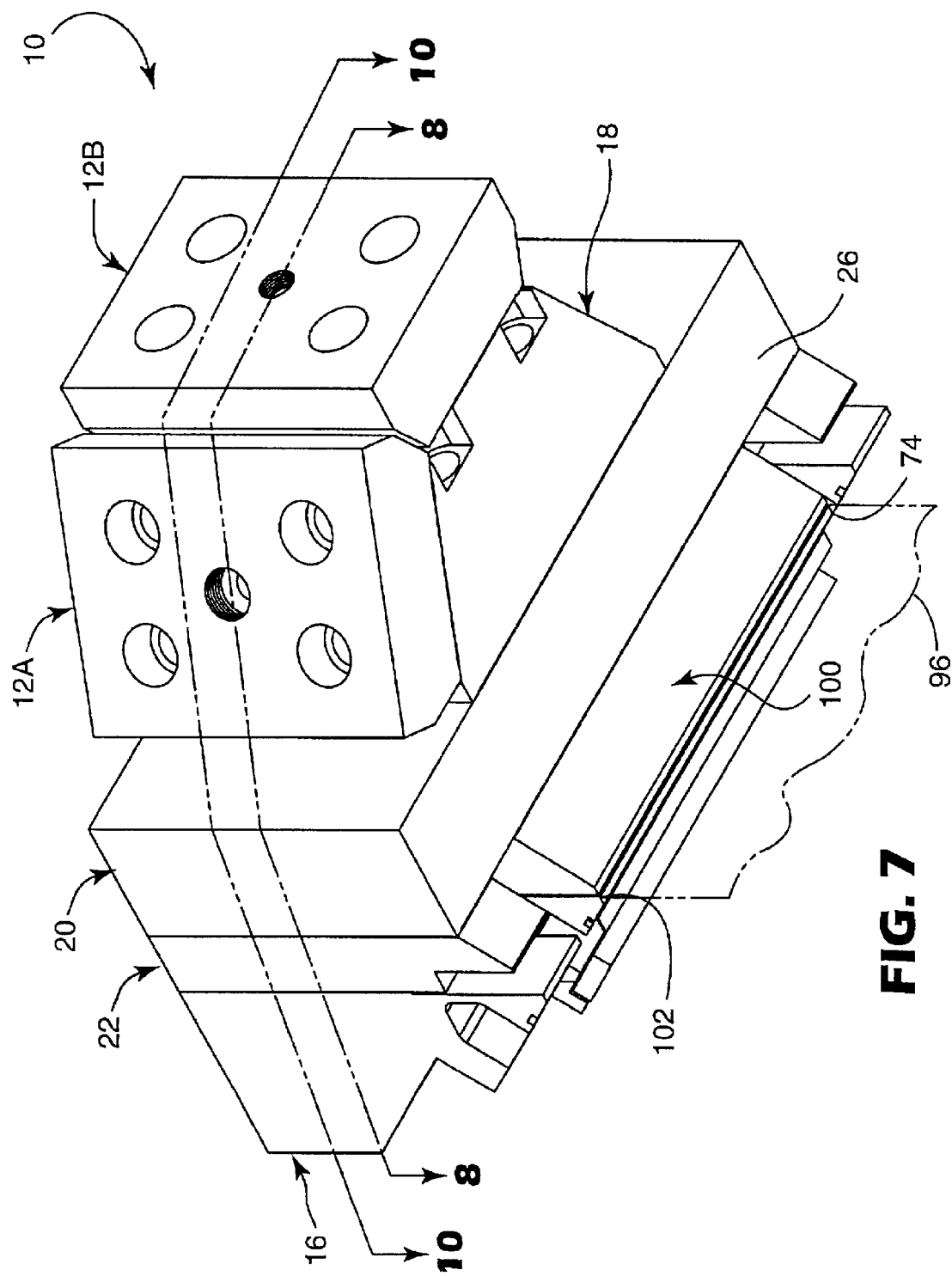
FIG. 7 is a perspective view of one embodiment of the inventive extrusion device.

A perspective view illustrating the bottom side of extrusion device 10 is illustrated in FIG. 7. Lip opening 74 is shown along with first and second lips 100 and 102 at the output of extrusion device 10. While the thickness of each individual layer of extrudate 96 can be controlled by precisely machining gap output apertures 56 and chamber openings 58 (as described and shown previously), an additional method for controlling the thickness of extrudate 96 is by compressing or releasing first lip 100 towards second lip 102. This method is commonly used and may be incorporated into the current inventive extrusion device 10. Additionally, end plates (not shown) which are known in the art are typically used in conjunction with extrusion device 10 and are disposed on either side of lip opening 74 proximate first side 28 and second 30 of extrusion device 10. End plates are mounted so as to minimize leaks.

Figure 8:
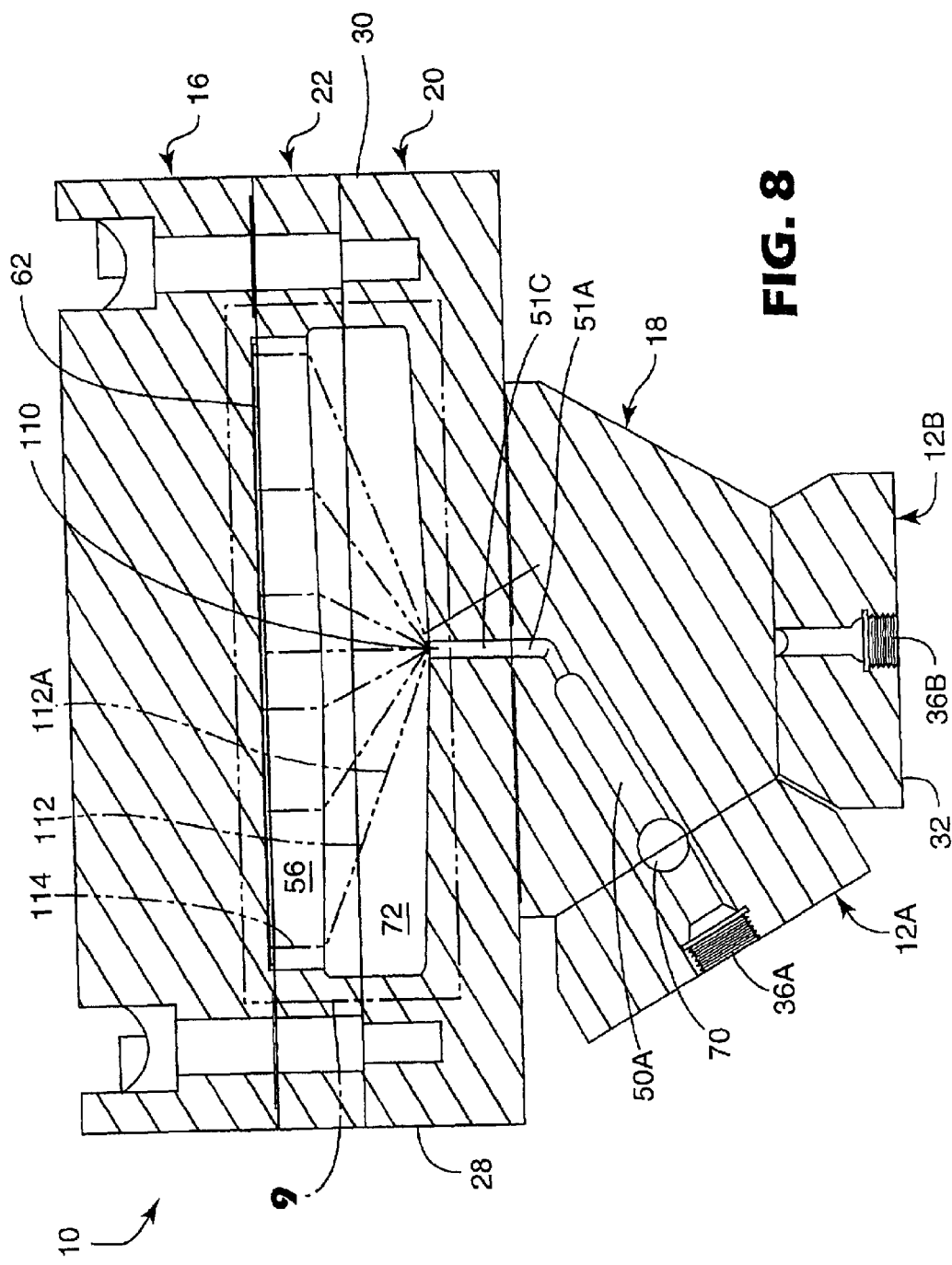
FIG. 8 is a cross-section of one embodiment of the inventive extrusion device as taken along lines 8—8 of FIG. 7.

A cross-section of the inventive extrusion device 10 taken along lines 8—8 of FIG. 7 is illustrated in FIG. 8. The cross-section is taken so as to show the width dimension (i.e., in the direction extending from first side 28 to second side 30 of extrusion device 10) of one first chamber 72 with gap output aperture 56 extending to laminate chamber 62. In one embodiment, the width of gap output aperture 56 (and laminate chamber 62) is approximately 10 inches (254 mm). The material path is defined from feed aperture 36A through first manifold 70 into first plenum 50A which transitions into first and third tube passages 51A and 51C. Input aperture 110 connects third tube passage 51C to first chamber 72. As discussed previously, the length of gap output aperture 56 extends from first chamber 72 to laminate chamber 62. FIG. 8 illustrates that this transition between first chamber 72 and output aperture 56 varies in length along the width dimension of output aperture 56. To show this variation, a series of first distances 112 are defined from input aperture 110 to points along the interface between output aperture 56 and first chamber 72. While these first distances 112 are illustrated in FIG. 8, it should be noted that these are exemplary and that any point along this interface between the output aperture 56 and the first chamber 72 could have been used to define a first distance. It should also be noted that first distances will be referred to generally as "first distance 112" referencing all first distances. Specific first distances will be referred to with an appended letter; such as "first distance 112A".

A series of second distances 114 is illustrated as extending from the interface between the gap output aperture 56 and the first chamber 72 to the laminate chamber 62 (again, the second distance 114 will be used to refer to all second distances, with an appended letter such as "second distance 114A" used to indicate a particular distance). As the length of each first distance 112 increases from input aperture 110 to a point along the interface of first chamber 72 with gap output aperture 56, the corresponding second distance 114 decreases in length from the interface between the first chamber 72 and the gap output aperture 56 to the laminate chamber 62.

In one embodiment of the invention, the wall of each first chamber 72 most proximate the front side 32 of extrusion device 10 is parallel to the wall of each first chamber 72 most proximate the back side 34 of each first chamber 72. This same configuration can be utilized for second chambers 82 (shown best in FIG. 10). A person skilled in the art would realize, however, that other configurations are possible and do not depart from the scope of the invention.

Figure 9:
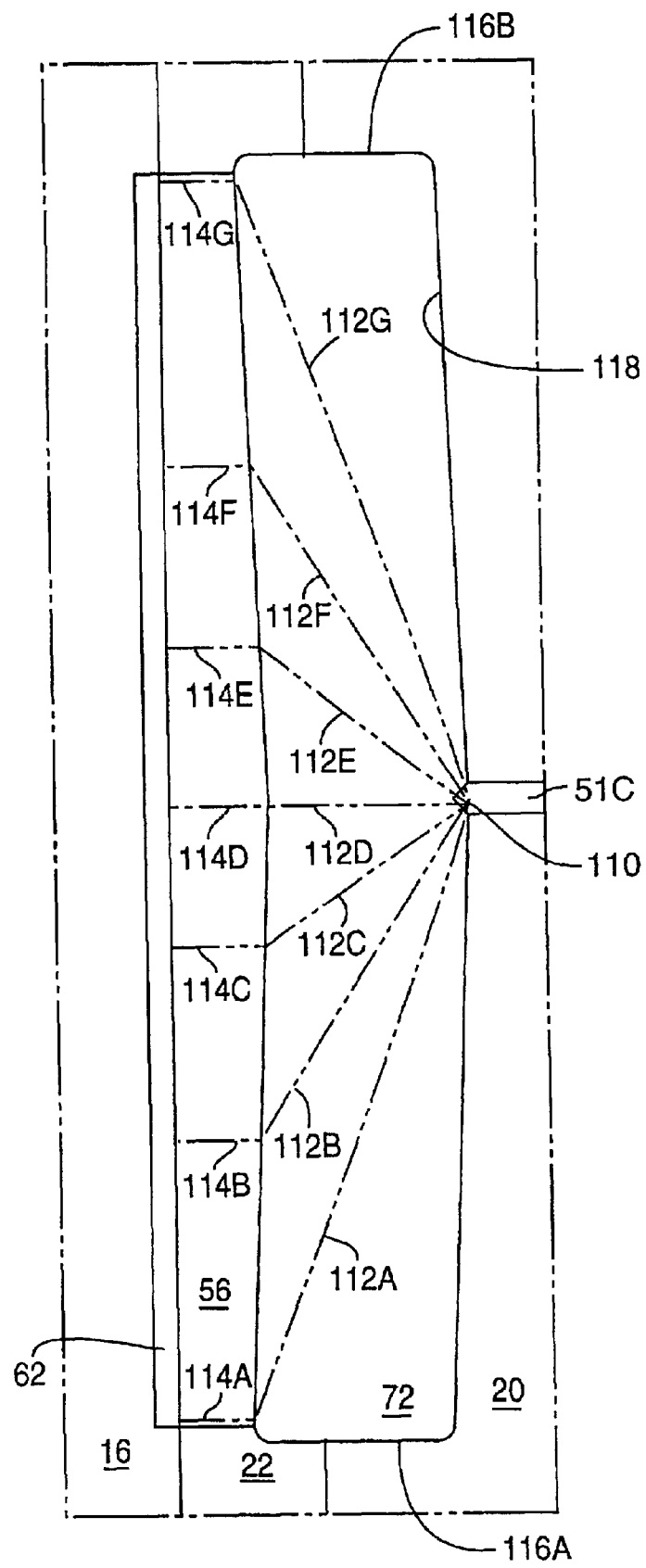
FIG. 9 is a close up sectional view of the area indicated by reference number 9 in FIG. 8.

An enlarged portion of the inventive extrusion device 10 indicated by reference number 9, is illustrated in FIG. 9. As is illustrated, by defining a series of first distances 112A–112G from a central point in input aperture 110 to a series of points along the interface with output aperture 56, it can be seen that a second distance 114A–114G corresponds to each first distance 112A–112G and increases or decreases accordingly. For example, first distance 112A at an outer position along the width dimension of first chamber 72 is longer than first distance 112D which extends to a middle point of output aperture 56. Consequently, second distance 114A, extending from the same point along the interface between first chamber 72 and output aperture 56 as first distance 112A is shorter than second distance 114D extending from the corresponding point along the interface as first distance 112D. Configuring the transition between output aperture 56 and first chamber 72 in this fashion causes material entering first chamber 72 from input aperture 110 to experience more resistance through output aperture 56 the closer the material is to input aperture 110. This is due to the fact that the material is forced through a small opening for a longer distance. The result is that a constant flow of material is forced through gap output aperture 56 across the width of gap output aperture 56. The resulting layer of material which is introduced into laminate chamber 62 is a constant thickness across the width of material (i.e., the width of gap output aperture 56).

In one embodiment, when the length of first distances 112A and 112G are approximately 5.3 inches (134.6 mm), the length of second distances 114A and 114G are approximately 0.8 inches (20.3 mm). At the same time, first distance 112D is approximately 1.6 inches (40.6 mm) and second distance 114D is approximately 1.0 inches (25.4 mm).

Figure 9A:
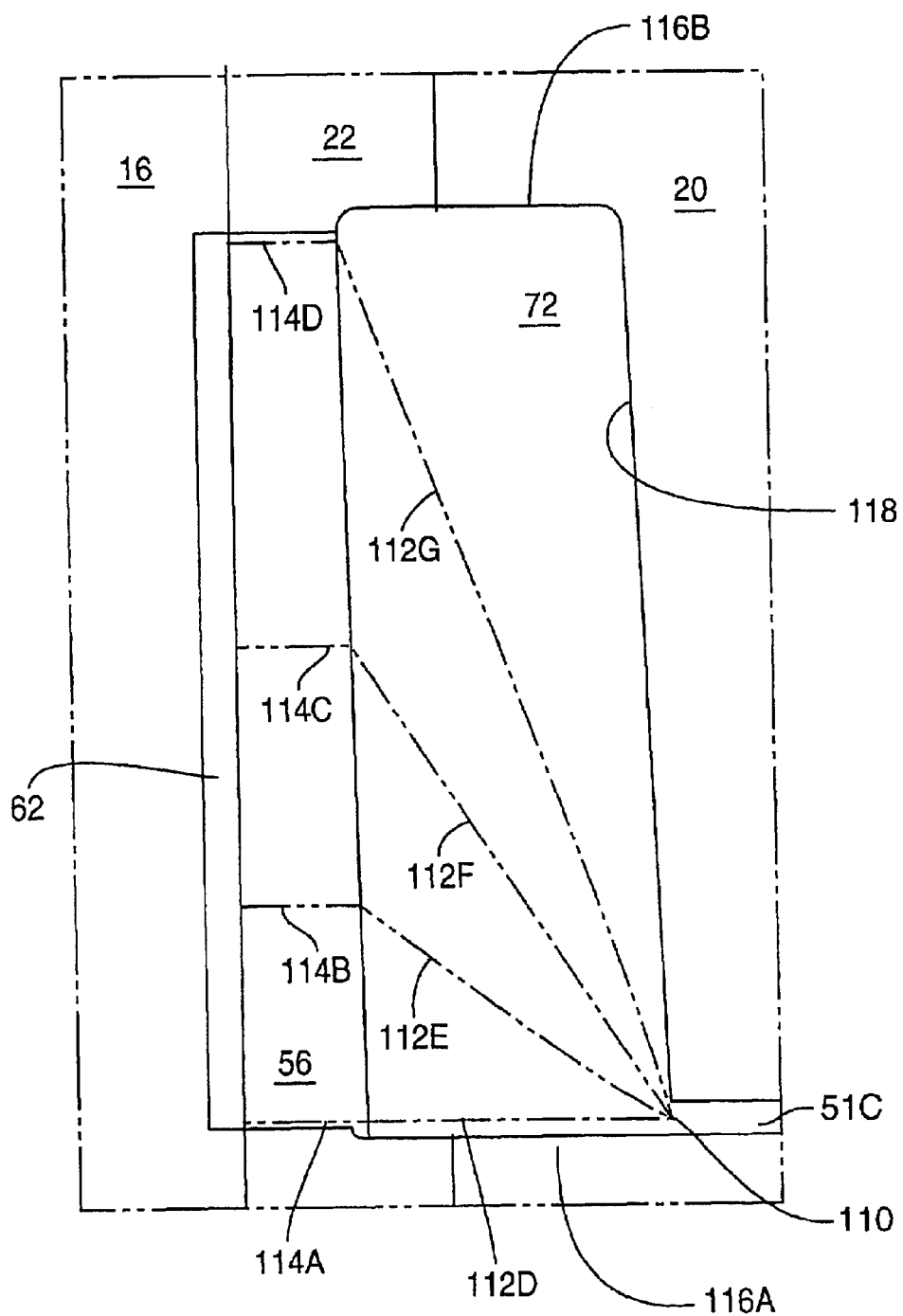
FIG. 9A is an alternate embodiment of the close up sectional view of the area indicated by reference number 9.

It should be noted that while FIG. 9 illustrates one embodiment of the shape of first chamber 72 and gap output aperture 56, other embodiments are contemplated. For Example, FIG. 9A illustrates another chamber shape which provides this same inventive relationship between first distance 112 and second distance 114. In this embodiment, input aperture 110 enters first chamber 72 along one end 116A (in the width dimension). Similar to the previous embodiment, however, the interface between gap output aperture 56 and first chamber 72 is configured such that the shortest first distance 112A which extends from input to a point along the transition to the gap output aperture 56 has the longest second distance 114A extending from that same point to laminate chamber 62. The longest first distance 112D extends from input aperture 110 to a point along gap output aperture near second end 116B of chamber 72 to laminate output chamber 62. All intervening first distances 112 get progressively longer from first distance 112A to first distance 112D and all intervening second distances 114 get progressively shorter from second distance 114A to second distance 114D.

It should be noted that front wall 118 of chamber 72 may also have varying levels of slope along the width dimension of chamber 72. This slanting front wall 118 is commonly used in a "coat hanger" shaped chamber, as would be known to one skilled in the art.

Figure 11:
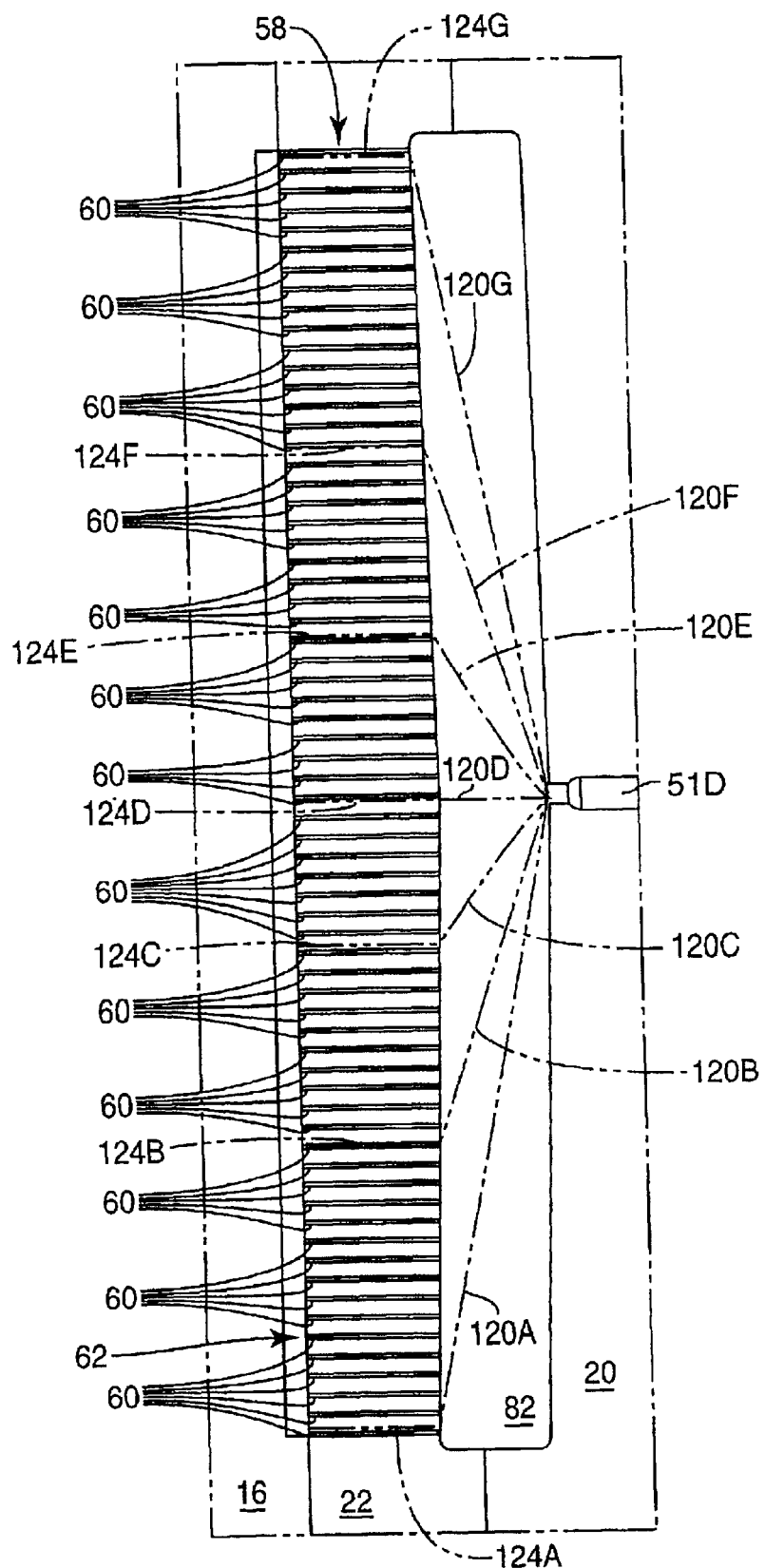
FIG. 11 is a close up sectional view of the area indicated by reference number 11 in FIG. 10.

FIG. 10 illustrates a cross-section of inventive extrusion device 10 as taken along line 10—10 of FIG. 7. The width of second chamber 82 is illustrated along with aperture array 58. A close-up view of the area indicated by reference number 11 is illustrated in FIG. 11. As previously described, aperture array 58 includes a series of holes 60 which are in communication with second chamber 82 and laminate chamber 62. Utilizing holes 60 in this fashion allows "fibers" of the material entering second chamber 82 to be extruded into laminate chamber 62.

Similar to first chamber 72, second chamber 82 can be shaped so that a series of third distances 120A–120G (all third distances referenced as 120) are defined between an input aperture 122 of second chamber 82 to positions along output array 58, as illustrated in FIG. 11. A fourth series of distances 124A–124G (all fourth distances referenced as 124) are defined by the distance of the chamber opening 58 (or aperture array) between the second chamber 82 and laminate chamber 62. As the length defined by each distance 120 increases, the associated fourth distance 124 decreases. For example, in the embodiment illustrated, a hole 60 disposed at the same position along the width of second chamber 82 as third distance 120A is shorter than a hole 60 defining fourth distance 124D disposed at the same position along the width of second chamber 82 as third distance 120D. Again, this configuration allows the flow rate across the width of second chamber 82 to be balanced, providing a constant thickness output at each of the holes 60 forming chamber opening 58. In one embodiment, when the length of third distance 120A and 120G for top second chamber 82A are approximately 5.4 inches (137.2 mm), the length of fourth distances 124A and 124G are approximately 0.9 inches (22.9 mm). At the same time, third distance 120D is approximately 0.87 inches (22.1 mm) and fourth distance 124D is approximately 1.0 inch (25.4 mm).

It should be noted that while chamber opening 58 is illustrated as a series of openings 60, chamber opening 58 could alternatively be an extended slot similar to that described with respect to first chamber 72. Additionally, the chamber opening 58 could extend only partly along the width of second chamber 82 or any other desirable configuration for the extruded end product.

Although the present invention has been described with reference to preferred embodiments, workers skilled in the art will recognize that changes may be made in form and detail without departing from the spirit and scope of the invention.

What is claimed is:

1. An extrusion apparatus comprising:
   an interleaving block portion including at least two first chambers including:
   an input aperture;
   an output aperture wider and shorter in height than the input aperture and defining a series of first distances from the input aperture to points along the output aperture;
   a width dimension;
   a length dimension, wherein the length dimensions of the first chambers are generally parallel;
   a height dimension; and
   a die portion having a laminate chamber having a height dimension disposed generally perpendicular to the length dimension of the first chambers, an output disposed at one end of the height dimension, the laminate chamber disposed so as to be in communication with the output apertures of the parallel first chambers.

2. The apparatus of claim 1 wherein the interleaving block further comprises:
   an output aperture second distance extending between the output aperture and the laminate chamber along the width of each output aperture, such that as the first distance increases from the input aperture to points along the output aperture, the second length distance from each point along the output aperture decreases in length.

3. The apparatus of claim 1 wherein the interleaving block portion further comprises:

a top side and a bottom side defining a height dimension;

wherein the width of each first chamber is disposed generally perpendicular with respect to the height dimension of the interleaving block; and wherein the height of the output aperture for each first chamber is incrementally smaller from each first chamber output aperture to an adjacent first chamber output aperture along the height dimension of the interleaving block.

4. The apparatus of claim 3, wherein an output of the laminate chamber is disposed proximate to the bottom side of the interleaving block and each output aperture incrementally decreases in height from a top first chamber to a bottom first chamber.

5. The apparatus of claim 1, wherein the interleaving block portion further comprises:

a top side and a bottom side defining a height dimension;

a second distance extending between each output aperture and the laminate chamber, wherein the second distance can vary along the width of each output aperture; and wherein the second distance for each first chamber output aperture incrementally changes along the height dimension of the interleaving block from each first chamber output to an adjacent first chamber output aperture at corresponding points of each output aperture.

6. The apparatus of claim 5, wherein an output of the laminate chamber is disposed proximate to the bottom side of the interleaving block and each corresponding second distance increases from a top first chamber to a bottom first chamber.

7. The apparatus of claim 1 wherein flowable material introduced at the input aperture exits the chamber through the output aperture at a substantially constant flow rate at any point along the width of the output aperture.

8. The apparatus of claim 1, wherein a width dimension of an output opening of the laminate chamber and the width dimension of at least one output aperture of the first chambers is substantially the same.

9. The apparatus of claim 1 wherein each first chamber input is in communication with a common supply.

10. The apparatus of claim 1 wherein an output opening of the laminate chamber is disposed generally perpendicular to the first chambers.

11. The apparatus of claim 1 further comprising:

at least one second chamber, each second chamber including:
a width;
a length;
a thickness;
an input; and
at least one output disposed immediately proximate to at least one first chamber output, wherein each second chamber output is in communication with the laminate chamber.

12. The apparatus of claim 1 further comprising:

at least two generally parallel second chambers, each second chamber including:
a width;
a length;
a thickness;
an input; and
at least one output disposed immediately proximate to at least one first chamber output, wherein each second chamber output is in communication with the laminate chamber.

13. The apparatus of claim 12 wherein the interleaving block portion further comprises:

a top side and a bottom side defining a height dimension;

wherein the height of the output for each first chamber is incrementally smaller from each first chamber to an adjacent first chamber output aperture along the height dimension of the interleaving block;

a plurality of second distances defined by each second chamber output and the laminate chamber; and wherein each second distance varies incrementally from one second chamber output to an adjacent second chamber output at a corresponding point along the width of each output.

14. The apparatus of claim 13 wherein an output of the laminate chamber is disposed proximate to the bottom side of the interleaving block and each second distance increases from a top second chamber to a bottom second chamber.

15. The apparatus of claim 12, wherein the interleaving block portion further comprises:

a top side and a bottom side defining a height dimension;

a second distance extending between each second chamber output and the laminate chamber; and wherein the second distance for each second chamber output aperture incrementally changes along the height dimension of the interleaving block from each second chamber output to an adjacent second chamber output aperture at corresponding points of each output aperture.

16. The apparatus of claim 15, wherein an output of the laminate chamber is disposed proximate to the bottom side of the interleaving block and each corresponding second distance increases from a top second chamber to a bottom second chamber.

17. The apparatus of claim 12 wherein the interleaving block further comprises:

a top side and a bottom side defining a height dimension;

wherein the width of each second chamber is disposed generally perpendicular with respect to the height dimension of the interleaving block; and wherein each output height for each second chamber is incrementally smaller from each second chamber output to an adjacent second chamber output along the height dimension of the interleaving block.

18. The apparatus of claim 17 wherein an output of the laminate chamber is disposed proximate to the bottom side of the interleaving block and each output incrementally decreases in height from a top second chamber to a bottom second chamber.

19. The apparatus of claim 12 wherein each second chamber is in communication with a common supply.

20. The apparatus of claim 12 wherein the laminate chamber is disposed generally perpendicular to the width of the second chambers.

21. The apparatus of claim 12 wherein each output defines a series of third distances from the input to points along the output, and a series of fourth distances extending between points along the output and the laminate chamber such that as the third distance increases from the input to points along the output, the fourth distance decreases in length.

22. The apparatus of claim 12 wherein flowable material introduced at the input aperture of each second chamber exits the second chamber through the output aperture of each second chamber at a substantially constant flow rate at any point along the width of the output aperture.

23. The apparatus of claim 12 wherein the laminate chamber further comprises:

an extrudate aperture, wherein width dimension of the extrudate aperture and the width dimension of at least one of the second chamber output apertures are substantially the same.

24. The apparatus of claim 12 wherein the output of each second chamber further comprises:
a plurality of openings disposed intermittently along the width defined by the first chambers, each opening being in communication with the laminate chamber.

25. The apparatus of claim 24 wherein the interleaving block further comprises:
a top side and a bottom side defining a height dimension, wherein the width of each first and second chamber is disposed generally perpendicular to the height dimension of the interleaving block;
wherein the thickness of the output aperture for each first chamber is incrementally smaller than the output aperture of any first chamber disposed immediately adjacent and more proximate to the bottom side; and
wherein the distance between each second chamber output and the laminate chamber is incrementally shorter than any second chamber disposed immediately adjacent and more proximate to the bottom side.

26. The apparatus of claim 24 wherein the interleaving block portion further comprises:
a top side and a bottom side defining a height dimension; and
wherein the height of the output for each second chamber is incrementally smaller from each second chamber to an immediately adjacent second chamber output aperture along the height dimension of the interleaving block.

27. The apparatus of claim 26 wherein an output of the laminate chamber is disposed proximate to the bottom side of the interleaving block and each second chamber output height increases from a top second chamber to a bottom second chamber.

28. The apparatus of claim 24 wherein the interleaving block portion further comprises:
a top side and a bottom side defining a height dimension;
wherein the width of each second chamber is disposed generally perpendicular with respect to the height dimension of the interleaving block; and
wherein the height of the output aperture for each second chamber is incrementally smaller from one second chamber output aperture to an adjacent first chamber output aperture.

29. The apparatus of claim 28, wherein an output of the laminate chamber is disposed proximate to the bottom side of the interleaving block and each output aperture incrementally decreases in height from a top first chamber to a bottom first chamber.

30. The apparatus of claim 24, wherein the first chambers are configured to receive a matrix material, and the second chambers are configured to receive a fiber material.

31. The apparatus of claim 24, wherein the interleaving block portion further comprises:
a top side and a bottom side defining a height dimension;
a second distance extending between each second chamber output and the laminate chamber; and
wherein the second distance for each second chamber output aperture incrementally changes along the height dimension of the interleaving block from each second chamber output to an adjacent second chamber output aperture at corresponding points of each output aperture.

32. The apparatus of claim 31, wherein an output of the laminate chamber is disposed proximate to the bottom side of the interleaving block and each corresponding second distance increases from a top second chamber to a bottom second chamber.

33. An apparatus comprising:
an interleaving block portion including:
a series of first chambers each having outputs, the first chambers configured so as to contain a matrix material, wherein each first chamber acts to spread the matrix material to a pre-determined width, and constant thickness at each output;
a series of second chambers configured so as to contain a fiber material, wherein the second chambers have a plurality of outputs disposed intermittently along the pre-determined width; and
a die portion including a laminate chamber disposed generally perpendicular with respect to the series of first and second chambers in communication with the outputs of each first and second chambers and in communication with the outputs of each first and second chamber, wherein the die portion combines the matrix material and the fiber material so as to form extrudate at the pre-determined width.

34. A method for extruding a multi-layer extrudate comprising:
moving a first material through a plurality of generally parallel first chambers each first chamber having a length dimension an input aperture and an output aperture wider and shorter in height than the input aperture, the first chambers being generally parallel along the length dimension in an interleaving block;
moving the first material through at least one output aperture into a die portion having a laminate chamber, the laminate chamber having a height dimension perpendicular to the length dimension of the first chambers said laminate chamber being connected with the output apertures of the first chambers;
layering the first material exiting each output aperture in the laminate chamber to form a multi-layer stream; and
extruding the layered first material from a laminate chamber output disposed at one end of the height dimension of the laminate chamber.

35. The method of claim 34, further comprising:
moving a fiber material through at least one second chamber having an input end, an output end, and a length dimension substantially parallel to the length dimensions of the first chambers;
moving the fiber material through multiple output holes at the output end individually in communication with each second chamber and connected to either the laminate chamber or the output apertures of the first chamber so that the fiber material is extruded as part of the multilayer extrudate.

* * * * *